(12) United States Patent
Casey et al.

(10) Patent No.: US 10,889,312 B2
(45) Date of Patent: Jan. 12, 2021

(54) SELF-BALANCING AND POWER-ASSISTED PAYLOAD CARRYING VEHICLES USING OPERATOR-APPLIED FORCE SENSING

(71) Applicant: Segway, Inc., Bedford, NH (US)

(72) Inventors: Michael J. Casey, Bedford, NH (US); Kimberley A. St. Louis, Bedford, NH (US); Nicholas A. DeAngelis, Bedford, NH (US); Benjamin C. Minerd, Bedford, NH (US); Robert M. Bowman, Bedford, NH (US); Jason A. Swift, Bedford, NH (US)

(73) Assignee: Segway, Inc., Bedford, NH (US)

( * ) Notice: Subject to any disclaimer, the term of this patent is extended or adjusted under 35 U.S.C. 154(b) by 387 days.

(21) Appl. No.: 15/848,968

(22) Filed: Dec. 20, 2017

(65) Prior Publication Data

US 2018/0170417 A1 Jun. 21, 2018

Related U.S. Application Data

(63) Continuation-in-part of application No. 15/617,758, filed on Jun. 8, 2017, now abandoned.

(Continued)

(51) Int. Cl.
*B62B 5/00* (2006.01)
*B62B 1/10* (2006.01)
(Continued)

(52) U.S. Cl.
CPC ............ *B62B 5/0073* (2013.01); *B62B 1/008* (2013.01); *B62B 1/10* (2013.01); *B62B 1/14* (2013.01);
(Continued)

(58) Field of Classification Search
CPC ..... B62B 5/0073; B62B 5/0069; B62B 5/023; B62B 5/026; B62B 5/0033; B62B 1/008;
(Continued)

(56) References Cited

U.S. PATENT DOCUMENTS 5,701,965 A * 12/1997 Kamen .................... A61G 5/04
180/7.1
6,062,328 A * 5/2000 Campbell ............. B62B 5/0026
180/216

(Continued)

FOREIGN PATENT DOCUMENTS

DE 102009001513 A1 9/2010
DE 102013102020 A1 8/2014
(Continued)

OTHER PUBLICATIONS https://www.amazon.com/Digital-Aluminum-Magnetic-Compatible-Threaded/product-reviews/B00OZHIGGE 5-star Amazon Product Review by A. Cook, dated Aug. 24, 2015 10" Digital Level with Laser and Durable Aluminum Magnetic Base, Compatible with all 1/4" Threaded Tripod Mounts (Year: 2015).*

(Continued)

*Primary Examiner* — Thomas E Worden
(74) *Attorney, Agent, or Firm* — Burns & Levinson, LLP; Joseph M. Maraia

(57) ABSTRACT

A method of operating a payload-carrying vehicle having two laterally disposed wheels positioned along a central axis is described. The method includes measuring a force applied by a user to the hand truck, where the measured force comprising a direction and a magnitude, and providing torque to each wheel to cause each wheel to rotate in a respective direction as a function of the measured magnitude and direction. The amount of torque provided to each wheel in response to the force from the user is such that the (Continued)

magnitude of measured force applied by the user is not greater than a predetermined threshold value.

11 Claims, 29 Drawing Sheets

Related U.S. Application Data

(60) Provisional application No. 62/453,247, filed on Feb. 1, 2017, provisional application No. 62/437,392, filed on Dec. 21, 2016.

(51) Int. Cl.
    *B62B 5/02*         (2006.01)
    *B62B 1/14*         (2006.01)
    *B62B 1/00*         (2006.01)

(52) U.S. Cl.
    CPC ............ *B62B 1/145* (2013.01); *B62B 5/0069* (2013.01); *B62B 5/023* (2013.01); *B62B 5/026* (2013.01); *B62B 5/0033* (2013.01); *B62B 2203/72* (2013.01); *B62B 2301/254* (2013.01)

(58) Field of Classification Search
    CPC .. B62B 1/10; B62B 1/14; B62B 1/145; B62B 2203/72; B62B 2301/254
    See application file for complete search history.

(56) References Cited

U.S. PATENT DOCUMENTS

| | | | | |
|---|---|---|---|---|
| 7,886,853 | B2 * | 2/2011 | Konopa | ................... B62B 1/26 180/19.1 |
| 2006/0254831 | A1 * | 11/2006 | Kamei | .................. B62B 5/0026 180/6.5 |
| 2009/0133517 | A1 * | 5/2009 | Kamara | ................ B62B 5/0033 74/10.29 |
| 2013/0161917 | A1 * | 6/2013 | Trapnell | .................... B62B 1/12 280/47.29 |
| 2014/0210172 | A1 * | 7/2014 | Lurie | ...................... B62B 1/262 280/47.24 |
| 2018/0354539 | A1 * | 12/2018 | Casey | ................... G01L 5/0095 |

FOREIGN PATENT DOCUMENTS

| | | |
|---|---|---|
| WO | 2005094480 A2 | 10/2005 |
| WO | 2008100524 A2 | 8/2008 |
| WO | 2012160400 A1 | 11/2012 |

OTHER PUBLICATIONS

International Search Report and Written Opinion from related PCT Application No. PCT/US2017/067211 dated Oct. 2, 2018.

\* cited by examiner

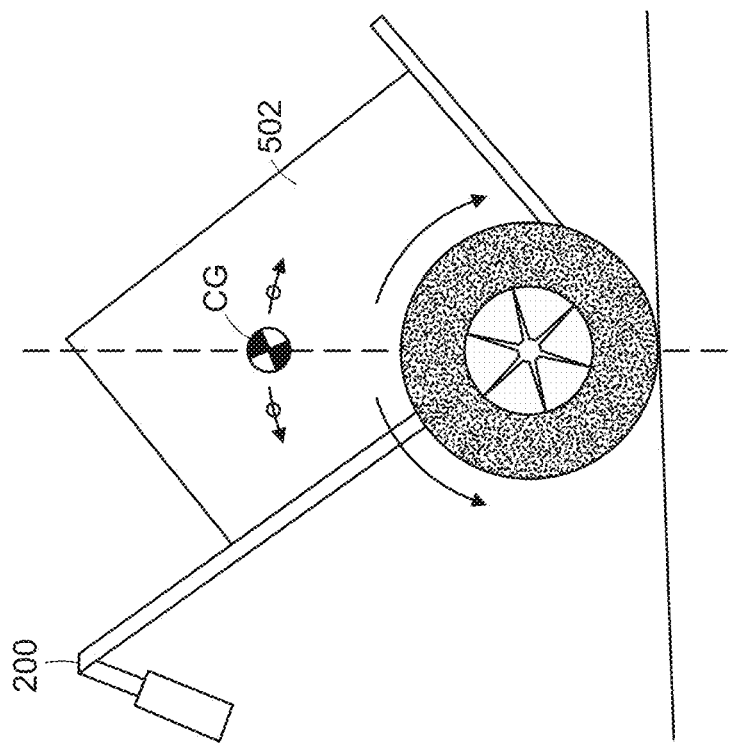
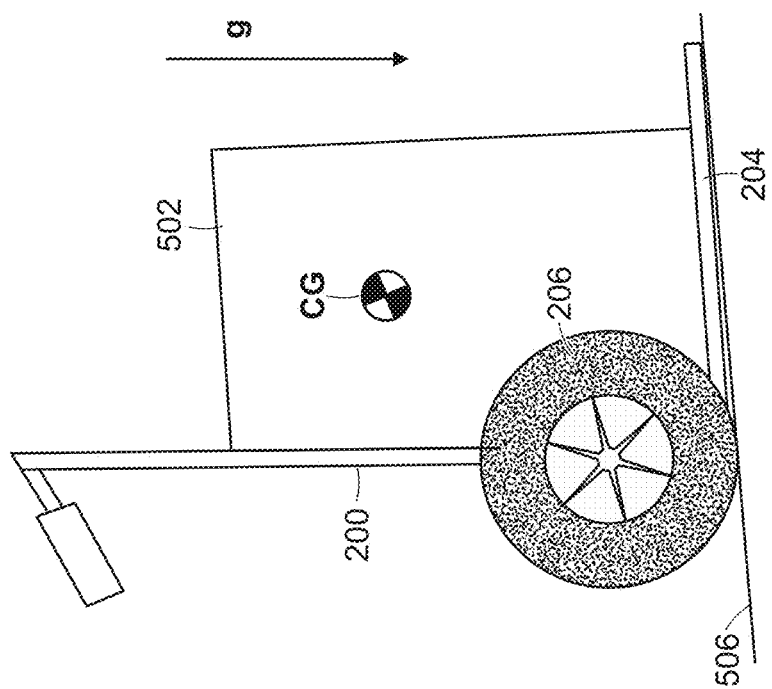
FIG. 6B
FIG. 6A

SELF-BALANCING AND POWER-ASSISTED PAYLOAD CARRYING VEHICLES USING OPERATOR-APPLIED FORCE SENSING

RELATED APPLICATIONS

This application is a continuation-in-part of U.S. non-provisional patent application Ser. No. 15/617,758 entitled "Control Of A Power-Assisted Payload Carrying Vehicle Using Operator-Applied Force Sensing," filed Jun. 8, 2017. This application also claims priority to U.S. provisional patent application Ser. No. 62/437,392 entitled "Self-Balancing Powered Hand Truck," filed Dec. 21, 2016 and U.S. provisional patent application Ser. No. 62/453,247 entitled "Self-Balancing Powered Hand Truck," filed Feb. 1, 2017, the entire contents of each of which is incorporated by reference herein for all purposes.

FIELD OF THE INVENTION

The disclosure relates to control of power-assisted and self-balancing payload-carrying vehicles.

BACKGROUND OF THE INVENTION

Vehicles known for moving a payload, e.g., boxes, appliances, people, and the like, include hand trucks, carts, pallet jacks, wheel barrows, etc. For many years, these vehicles were powered only by the operator and this required strength to move a heavy load. Strength was needed on level ground as well as when the load had to be moved on a ramp—either up or down the ramp, as the operator needs to balance the load and push, or pull, the vehicle to maintain control and keep it from spilling the payload.

A hand truck, also known as a two-wheeler or a dolly, includes an L-shaped frame with handles at one end, wheels at the base and with a deck upon which one can place one or more objects, oftentimes, boxes, as a payload. In many instances, the deck is inserted, or slid, underneath the payload to be carried, then the truck frame and payload are tilted backward until the weight is balanced over the wheels. This leveraging makes otherwise bulky and heavy objects easier to move. As is well known, the hand truck is widely used in various areas such as furniture moving, package delivery, etc.

A known powered hand truck is described in U.S. Pat. No. 9,120,657. FIG. 1 is a perspective view of a prior art powered hand truck illustrating a deck 100, a frame 102, a drive axis 103, an electric motor 104 powered by a battery (not shown), a shift box 106, handles 108 and wheels 110. Powering the wheels 110 allows for less effort by the user especially when working with heavier loads and/or pushing the hand truck up a ramp or controlling a heavy hand truck going down a ramp.

What is needed, however, is a payload-carrying vehicle that provides more functionality to the operator than those that are known.

SUMMARY

A method of operating a hand truck having two laterally disposed wheels positioned along a central axis comprises: 1) measuring a force applied by a user to the hand truck, the measured force comprising a direction and a magnitude; and 2) providing torque to each wheel to cause each wheel to rotate in a respective direction as a function of the measured magnitude and direction such that the magnitude of measured force applied by the user is not greater than a predetermined threshold value.

A hand truck comprises a frame defining a payload deck and a handle; a drive module coupled to the frame; two laterally disposed wheels, positioned along a central axis, each wheel coupled to the drive module; at least one sensor, coupled to the frame, and configured to detect a value of a force applied to the handle by a user; and a controller, coupled to the drive module, configured to: 1) receive the force value from the at least one sensor, the force value comprising a direction and a magnitude; and 2) control the drive module to provide an amount of torque to each wheel to cause each wheel to rotate in a respective direction as a function of the force magnitude and direction such that the magnitude of measured force applied by the user is not greater than a predetermined threshold value.

A method of operating a hand truck having two laterally disposed wheels positioned along a central axis, the hand truck having a center of mass, comprises: a user setting a static balance point by orienting the hand truck to place the center of mass directly above the central axis; and subsequent to the setting of the static balance point: 1) measuring a force applied by the user to the hand truck, the measured force comprising a direction and a magnitude; and 2) providing torque to each wheel to cause each wheel to rotate in a respective direction as a function of the measured force direction while maintaining the hand truck oriented at the static balance point and such that the magnitude of measured force applied by the user is kept below a predetermined threshold value.

A hand truck comprises: a frame defining a payload deck and a handle; a drive module coupled to the frame; two laterally disposed wheels, positioned along a central axis, each wheel coupled to the drive module; at least one sensor, coupled to the frame, and configured to detect a value of a force applied to the handle by a user; at least one orientation sensor, coupled to the frame, and configured to detect an orientation of the frame; and a controller, coupled to the drive module, the at least one orientation sensor and the at least one force sensor. The controller is configured to: 1) receive an indication from a user that the frame is oriented at a static balance point where a center of mass of the hand truck is placed directly above the central axis; and 2) retrieve and store at least one orientation value from the at least one orientation sensor corresponding to the orientation of the frame at the static balance point. The controller is further configured to: a) receive force values from the at least one sensor, each force value comprising a direction and a magnitude; b) receive orientation values from the at least one orientation sensor; and c) control the drive module to provide an amount of torque to each wheel to cause each wheel to rotate in a respective direction in order maintain the magnitude of measured force applied by the user to below a predetermined threshold value while maintaining the hand truck oriented at the static balance point, the amount of provided torque determined as a function of: i) the received force values magnitudes and directions; ii) the received orientation values; and iii) the stored static balance point orientation values.

A method of operating a hand truck having two laterally disposed wheels positioned along a central axis, each wheel powered by a respective motor, the hand truck having a center of mass, comprises: 1) a user setting a static balance point by orienting the hand truck to place the center of mass directly above the central axis; and 2) subsequent to the setting of the static balance point: controlling each motor to provide torque to the respective wheel to maintain the hand truck oriented at the static balance point.

A hand truck comprises: a frame defining a payload deck and a handle; a drive module coupled to the frame; two laterally disposed wheels, positioned along a central axis, each wheel coupled to the drive module, each wheel powered by a respective motor; at least one orientation sensor, coupled to the frame, and configured to detect an orientation of the frame; and a controller, coupled to the drive module and the at least one orientation sensor. The controller is configured to: 1) receive an indication from a user that the frame is oriented at a static balance point where a center of mass of the hand truck is placed directly above the central axis; 2) retrieve and store at least one orientation value from the at least one orientation sensor corresponding to the orientation of the frame at the static balance point; and 3) to: a) receive orientation values from the at least one orientation sensor; and b) control the drive module to provide an amount of torque to each wheel to cause each wheel to rotate in a respective direction in order to maintain the hand truck oriented at the static balance point, the amount of provided torque determined as a function of the received orientation values and the stored static balance point orientation values.

A method of operating a hand truck having two laterally disposed wheels positioned along a central axis, each wheel powered by a respective motor, the hand truck having a center of mass, comprises: repeatedly tilting the hand truck fore and aft to repeatedly move the center of mass fore and aft over the central axis; detecting, while repeatedly tilting, when the center of mass is directly above the central axis and setting that point as a static balance point; and controlling each motor to provide torque to the respective wheel to maintain the hand truck at the static balance point.

A hand truck comprises: a frame defining a payload deck and a handle; a drive module coupled to the frame; two laterally disposed wheels, positioned along a central axis, each wheel coupled to the drive module, each wheel powered by a respective motor; at least one orientation sensor, coupled to the frame, and configured to detect an orientation of the frame; and a controller, coupled to the drive module and the at least one orientation sensor. The controller is configured to: 1) receive an indication from a user that the frame is oriented at a static balance point where a center of mass of the hand truck is placed directly above the central axis; 2) retrieve and store at least one orientation value from the at least one orientation sensor corresponding to the orientation of the frame at the static balance point; and 3) to: a) receive orientation values from the at least one orientation sensor; and b) control the drive module to provide an amount of torque to each wheel to cause each wheel to rotate in a respective direction in order to maintain the hand truck oriented at the static balance point, the amount of provided torque determined as a function of the received orientation values and the stored static balance point orientation values.

A method of operating a hand truck having two laterally disposed wheels positioned along a central axis, each wheel powered by a respective motor, the hand truck having a center of mass, comprises: repeatedly tilting the hand truck fore and aft to repeatedly move the center of mass fore and aft over the central axis; detecting, while repeatedly tilting, when the center of mass is directly above the central axis and setting that point as a static balance point; and controlling each motor to provide torque to the respective wheel to maintain the hand truck at the static balance point.

A hand truck comprises: a frame defining a payload deck and a handle; a drive module coupled to the frame; two laterally disposed wheels, positioned along a central axis, each wheel coupled to the drive module, each wheel powered by a respective motor; at least one orientation sensor, coupled to the frame, and configured to detect an orientation of the frame; and a controller, coupled to the drive module and the at least one orientation sensor. The controller is configured to: 1) receive orientation values from the at least one orientation sensor; 2) determine, from the received orientation values, when the frame is oriented at a static balance point where a center of mass of the hand truck is placed directly above the central axis; and 3) store at least one orientation value from the at least one orientation sensor corresponding to the orientation of the frame at the static balance point; and to: a) receive orientation values from the at least one orientation sensor; and b) control the drive module to provide an amount of torque to each wheel to cause each wheel to rotate in a respective direction in order to maintain the hand truck oriented at the static balance point, the amount of provided torque determined as a function of the received orientation values and the stored static balance point orientation values.

A method of operating a hand truck having two laterally disposed wheels positioned along a central axis, each wheel powered by a respective motor, the motor powered by a battery and the hand truck having a center of mass, comprises: detecting a power level of the battery; comparing the detected battery power level to a predetermined threshold and determining whether the detected level is less than the predetermined threshold; and subsequent to a determination that the detected level is less than the predetermined threshold: controlling each motor to provide torque to the respective wheel in order to move the center of mass forward of the central axis to place a deck of the hand truck on a surface.

A hand truck, comprises: a frame defining a payload deck and a handle; a drive module coupled to the frame, the drive module comprising at least one motor and at least one battery coupled to the at least one motor; two laterally disposed wheels, positioned along a central axis, each wheel coupled to the at least one motor; at least one battery power sensor, coupled to the at least one battery, and configured to detect a power value of a respective battery; at least one orientation sensor, coupled to the frame, and configured to detect an orientation of the frame; and a controller, coupled to the drive module, the at least one orientation sensor and the at least one battery power sensor. The controller is configured to: receive orientation values from the at least one orientation sensor; receive battery power values from the at least one battery power sensor; and when a received at least one battery power level is at or below a predetermined minimum threshold value, control the drive module to provide an amount of torque to each wheel to cause each wheel to rotate in a respective direction in order to place the deck on a ground surface, wherein the amount of provided torque is determined as a function of the received orientation values.

BRIEF DESCRIPTION OF THE DRAWINGS

One or more aspects of the invention are discussed below with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended to be limiting.

FIGS. 6A and 6B represent a mode of operation of a hand truck;

DETAILED DESCRIPTION

Figure 1:
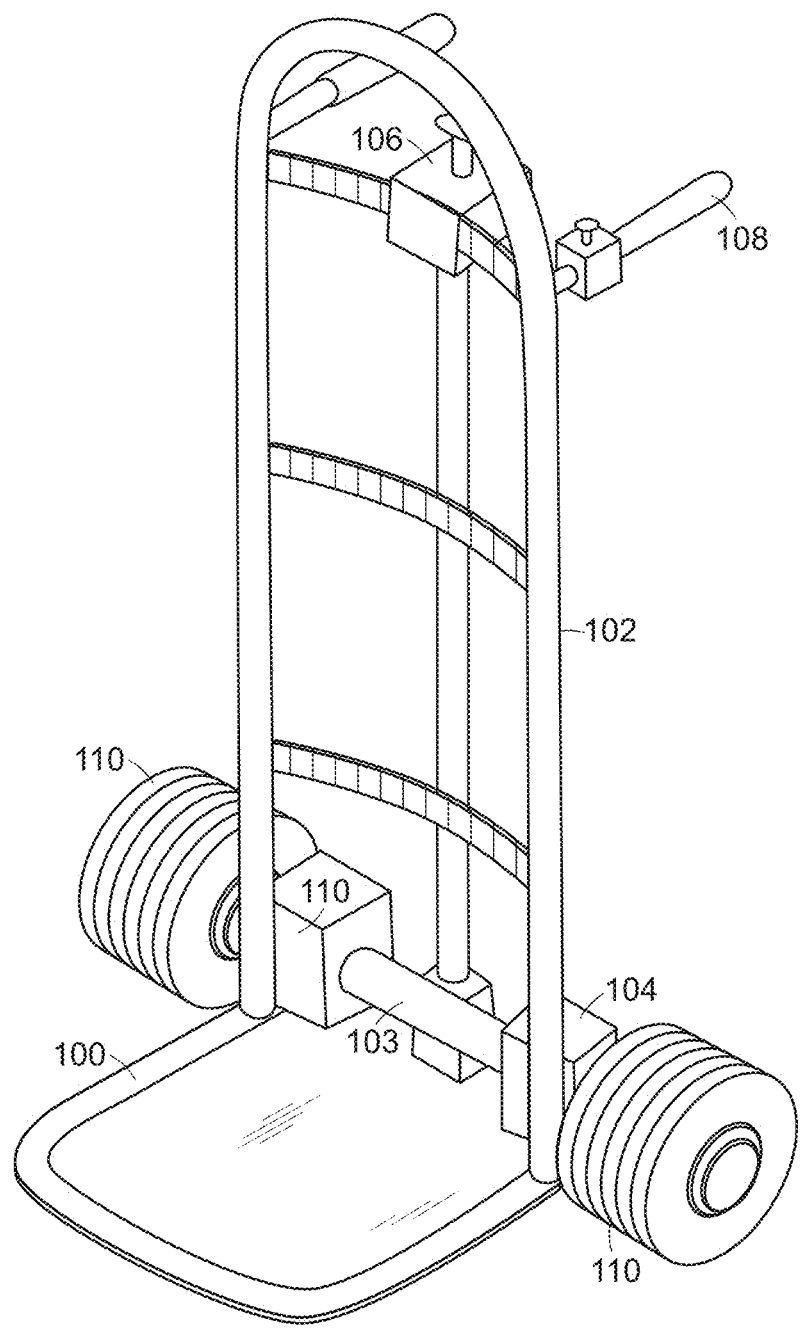
FIG. 1 is a perspective view of a prior art powered hand truck.

The entire contents of each of U.S. provisional patent application Ser. No. 62/437,392 entitled "Self-Balancing Powered Hand Truck," filed Dec. 21, 2016, U.S. provisional patent application Ser. No. 62/453,247 entitled "Self-Balancing Powered Hand Truck," filed Feb. 1, 2017 and U.S. non-provisional patent application Ser. No. 15/617,758 entitled "Control Of A Power-Assisted Payload Carrying Vehicle Using Operator-Applied Force Sensing," filed Jun. 8, 2017 are incorporated by reference herein for all purposes.

In the following detailed description, numerous specific details are set forth in order to provide a thorough understanding of the aspects and implementations of the disclosure. It will be understood by those of ordinary skill in the art that these may be practiced without some of the specific details that are set forth. In some instances, well-known methods, procedures, components and structures may not have been described in detail so as not to obscure the details of the implementations of the disclosure.

It is to be understood that the details of construction and the arrangement of the components set forth in the following description or illustrated in the drawings are not limiting. There are other ways of being practiced or carried out. Also, it is to be understood that the phraseology and terminology employed herein are for the purpose of description only and also should not be regarded as limiting.

It is appreciated that certain features, which are, for clarity, described in the context of separate implementations, may also be provided in combination in a single implementation. Conversely, various features, which are, for brevity, described in the context of a single implementation, may also be provided separately or in any suitable sub-combination.

Generally, as will be described below in more detail, various aspects and embodiments of a powered hand truck improve the user experience, provide self-balancing features, allow for constant user effort over variable loads and conditions, and provide assisted tilt and parking and mechanical failsafe features for braking and low-battery conditions.

In addition, in accordance with an aspect of the disclosure, a power-assisted payload carrying vehicle responds with additional torque being applied to the wheels in response to an amount of force applied by the operator. As will be described in more detail below, aspects of the present disclosure allow the operator to use the vehicle in an intuitive manner, i.e., the same as a non-powered vehicle, without having to learn a new procedure of operation. This improves the operator experience by providing a familiar interface to the vehicle.

Preliminarily, it should be noted that embodiment of aspects of the present disclosure are described with respect to a specific type of payload-carrying vehicle, i.e., a hand truck with two wheels that are generally co-axially positioned. It is to be understood that the aspects of the present disclosure are not limited to only a hand truck with two co-axially positioned wheels and the reference to hand truck is only for the purposes of explanation. The aspects of the present disclosure can be applied to, as non-limiting examples, lawnmowers, pallet jacks, suitcases, grocery carts, golf bag carts and wheelbarrows. Similarly, the teachings herein can be applied to payload-carrying vehicles with only one wheel, with two or more wheels, with two aft wheels and one or more forward wheels, with wheel clusters, with treads, or any other type of surface- or ground-contacting, torque-transmitting or traction-providing elements or mechanisms.

Figure 2:
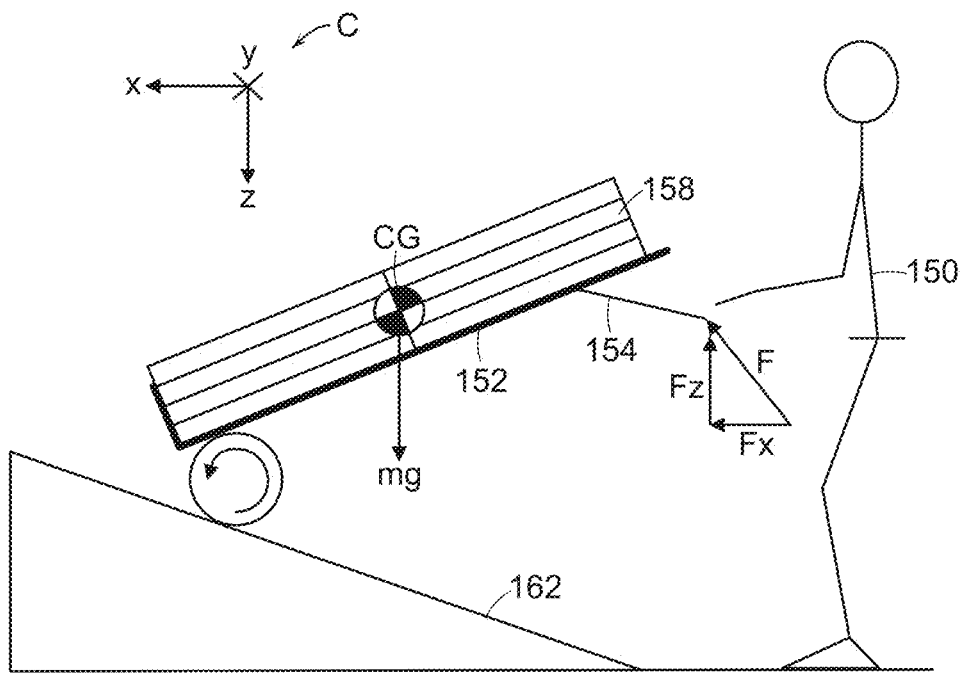
FIG. 2 is a conceptual view of operation of a non-powered hand truck.

Referring now to FIG. 2, an operator 150 of a known, non-powered hand truck 152, maneuvers the hand truck 152 by holding on to a handle 154. The operator 150 applies a force F to the handle to move the hand truck 152 in a desired direction, either forward or backward with respect to the operator 150. As shown in FIG. 2, for example, a payload 158 has a center of gravity CG and the operator 150 is using the hand truck 152 on a ramped surface 162. A weight of the payload 158 is represented by the force mg.

Figure 3:
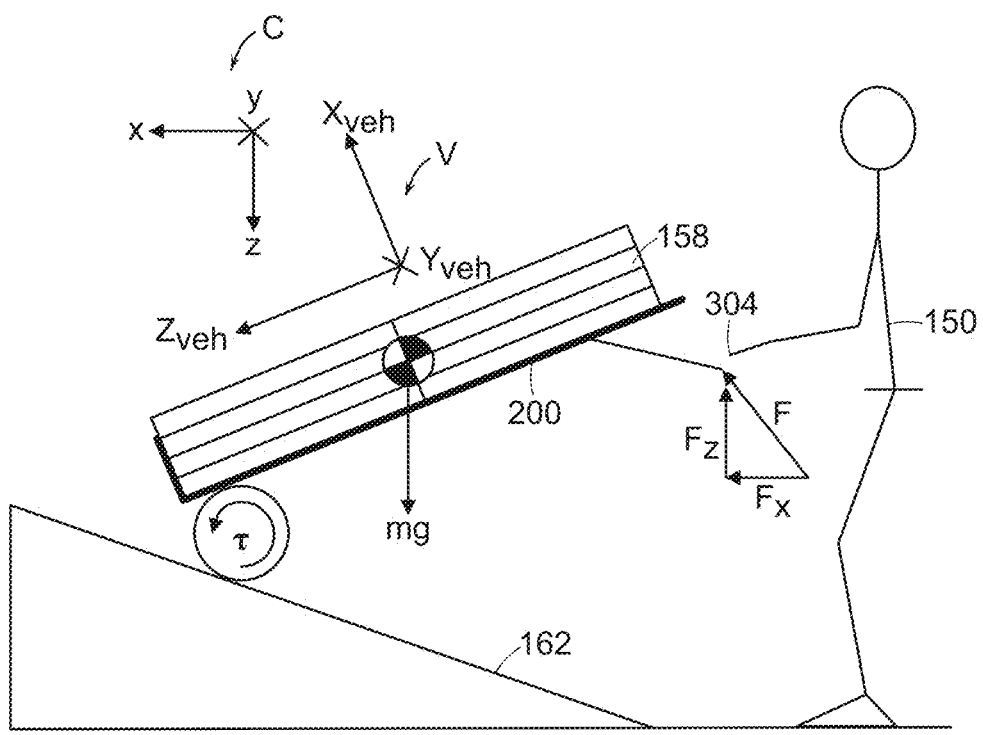
FIG. 3 is a conceptual view of operation of a power-assisted hand truck in accordance with an aspect of the present disclosure.

The force F exerted by the operator 150 on the hand truck 152 can be considered as a vector F with components $F_x$, $F_y$, and $F_z$, along respective X, Y, and Z axes. The X, Y, and Z axes refer to a first coordinate system C, as shown, relative to flat ground. More specifically, as shown in FIGS. 2 and 3, the Z axis is aligned with gravity, the X axis is aligned with a general direction of travel, for example, fore and aft with respect to the operator 150 and the Y axis is lateral with respect to the X axis (into the plane of FIGS. 2 and 3). As known, the hand truck 152 will move in response to the directions and magnitudes of these component forces $F_x$, $F_y$, and $F_z$.

As an example, referring now to FIG. 3, an operator 150 of a power-assisted hand truck 200 in accordance with an aspect of the present disclosure also maneuvers the hand truck 200 by holding on to a handle 208. The handle 208 includes a force sensing assembly 304, described in more detail below, that measures the force F applied by the operator 150 to the handle 208 to move the hand truck 200 in a desired direction, either forward or backward with respect to the operator 150.

As will be described below in more detail, the force F applied by the operator is measured with respect to a second coordinate system V that has three axes $X_{veh}$, $Y_{veh}$ and $Z_{veh}$ that are in a predetermined and fixed relation to the vehicle 200. Thus, the force components along these axes are measured. Subsequently, the "push" and "lift" components, $F_x$ and $F_z$, respectively, are calculated in the X, Y, Z coordinate system C by, for example, a rotation calculation as understood by one of ordinary skill in the art.

The hand truck 200 will apply an assistive torque T to the wheels as a function of the force F to aid the operator 150 in maneuvering the hand truck 200. Note that the torque T applied to the wheels may vary, for instance, a different amount of torque may be applied to each wheel if, for example, a turn is being implemented, or if the vehicle only has one wheel or traction mechanism. As set forth above, the operator 150 is using the hand truck 200 in the same manner as the non-powered hand truck 152 without having to use a different control device such as a throttle, joy stick, etc.

Figure 4:
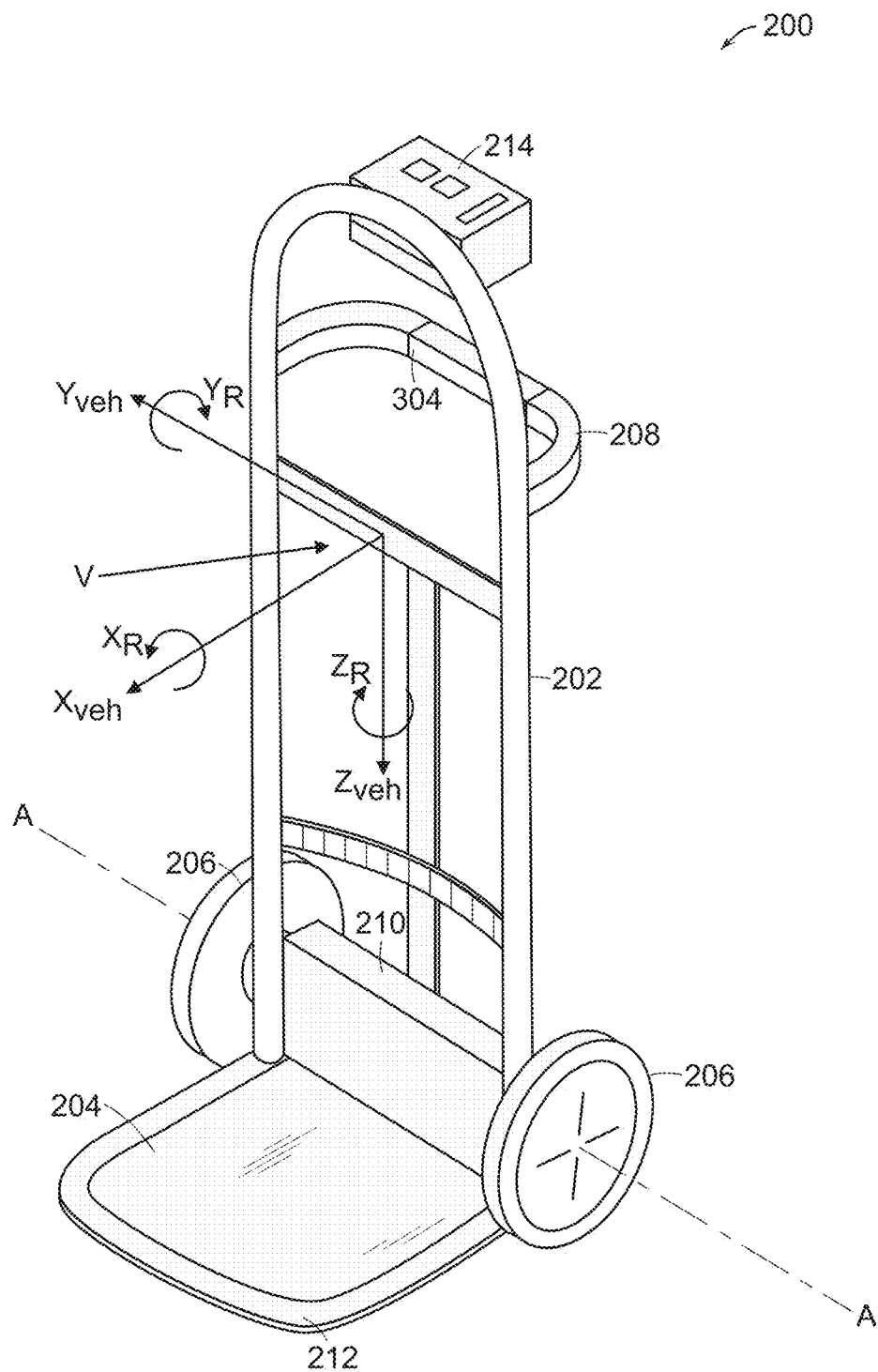
FIG. 4 is a perspective view of a power-assisted hand truck in accordance with an aspect of the present disclosure.

A perspective view of the hand truck 200 in accordance with an aspect of the present disclosure is presented in FIG. 4. The hand truck 200 includes a frame 202, a deck 204, wheels 206 and at least one handle 208. In addition, a drive system 210 provides power to the wheels 206. The drive system may be attached to the frame 202. It should be noted that the wheels 206 are provided such that they are co-axially arranged along an axis A-A whether or not the wheels are coupled to a same axle. A ground contact, also known as a "touchdown" sensor 212 may be provided on the deck 204 to detect when the deck 204 has been placed on a surface such as the ground, a loading dock, street, sidewalk or the like. An I/O console 214 is attached to the frame 202 and coupled to the drive system 210 in order to provide information to, and receive information from, an operator operating the hand truck 200.

The $X_{veh}$, $Y_{veh}$ and $Z_{veh}$ axes presented in FIG. 4 are those of the second coordinate system V and are the same as the ones discussed above with respect to FIG. 3. In addition, as aspects of the present disclosure also measure torque, axes of the torque measurements $X_R$, $Y_R$ and $Z_R$ are also shown.

Figure 5:
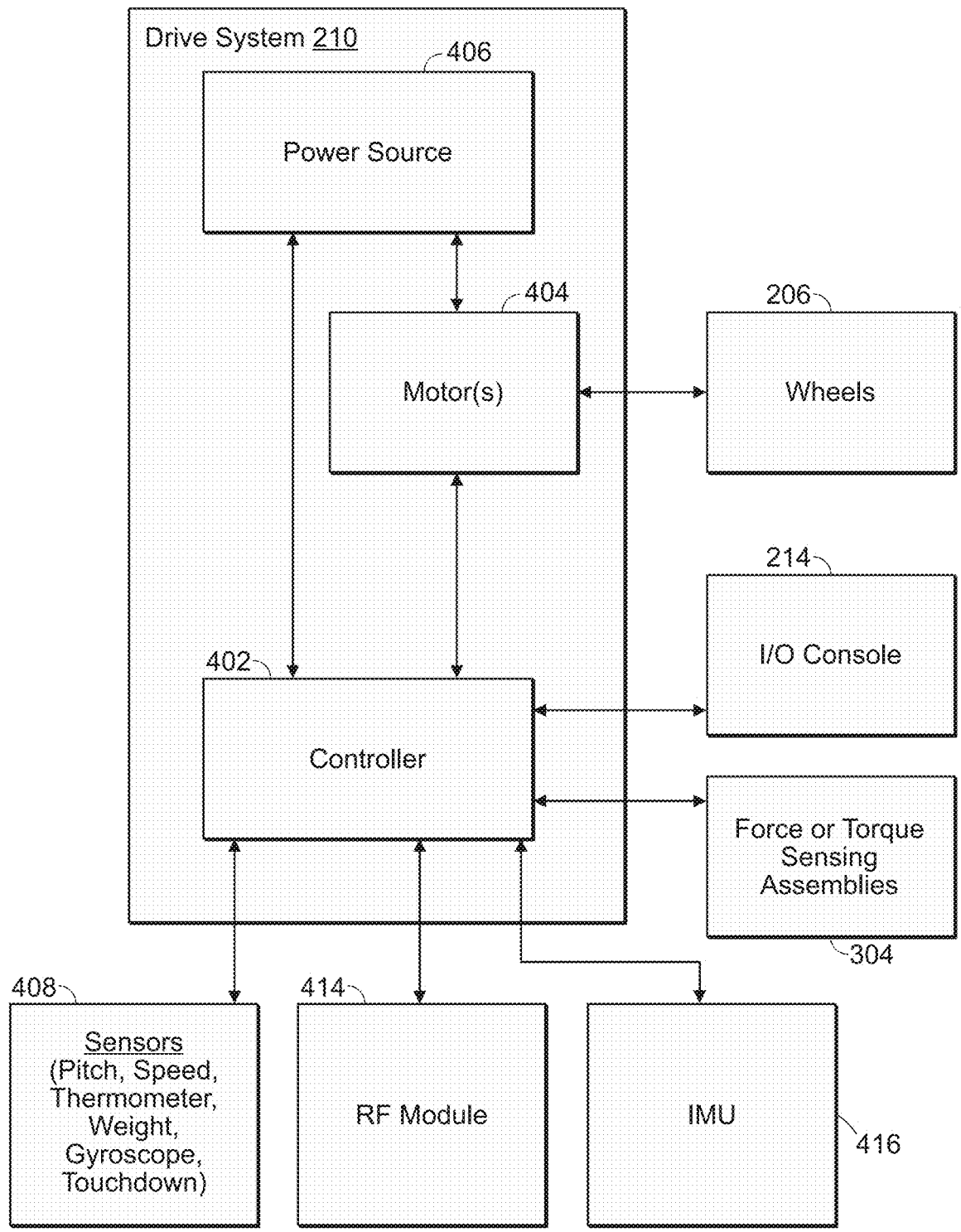
FIG. 5 is a functional block diagram of a vehicle control system in accordance with an aspect of the present disclosure.

As an example of one aspect of the present disclosure, a functional block diagram of the hand truck control system is shown in FIG. 5. The drive system 210 may include a power source 406, e.g., a rechargeable battery, coupled to one or more motors 404 that are coupled to the wheels 206. The system may include one motor per wheel or a single motor may drive both wheels with, or without, intervening gears or other coupling mechanisms. In addition, as understood by one of ordinary skill in the art, the wheels may be mounted on a single axle or directly coupled to a respective motor with the wheels aligned along the common axis A-A. The batteries may be rechargeable, e.g., Nickel Metal Hydride or Lithium-ion batteries.

A controller 402 is coupled to the motor(s) 404 and the power source 406 and receives inputs from a number of sensors 408 such as an accelerometer, pitch detector, a gyroscope, a thermometer, weight sensor, the touchdown indicator 212, a strain gauge, etc., mounted on the hand truck 200 for monitoring a number of conditions including, but not limited to, pitch, speed, temperature (ambient and/or battery and/or motor), payload weight, etc. In one aspect, the payload weight sensor detects the weight of the payload and the controller 402 adjusts the operation of the system in response. The controller 402 may be coupled to the I/O console 214 to provide/receive information to/from the operator as well as the force or torque sensor assemblies 304. In an alternate approach, the controller 400 may connect to a radio frequency (RF) module 414 containing a transceiver to enable communication with a hand held device such as a computer, tablet or smart phone. In addition, an Inertial Measurement Unit (IMU) 416 may also be provided.

The controller 402 may be configured to maintain the stability of the hand truck 200 while it is operating. The controller may continuously sense the orientation of the hand truck, determine the corrective action to maintain stability, and command the wheel motors to make the corrective action. The controller operates in a manner similar to that described in U.S. Pat. Nos. 6,302,230; 6,779,621 and 6,796,396; the subject matter of each of which is hereby incorporated by reference in their entirety for all purposes.

More specifically, the controller 402 receives information, sampling many times per second, e.g., on the order of 100 samples/second, from an assembly of gyroscopes and other sensors provided on the frame of the hand truck. As known, a gyroscope provides information regarding the pitch of an object, e.g., the hand truck, and how far it is away from an upright position, in addition to the rate of change of the pitch, e.g., its pitch rate, which can be adjusted by applying energy to the wheels 206. As known, the gyroscope may be implemented as a solid-state device using the Coriolis effect on a very small scale. Multiple gyroscopes may be provided to detect forward and backward pitch as well as leaning to the left or right (termed "roll"). Redundant sensors 408 may be provided as well as tilt sensors that use an electrolyte fluid to determine a position of the hand truck 200 relative to the ground or operating surface relative to the direction of gravity.

The system measures the amount of effort the operator is exerting while controlling the hand truck via the force or torque sensor assemblies 304. Examples of force and torque sensors are described below. The effort can be measured as force, torque, work, etc. In one aspect, if the amount of effort exceeds a predetermined threshold, more torque is provided to the wheels until the effort needed by the operator is at or below the threshold. The system thus modifies its power output to the wheels in response to the force from the operator.

Of course, the controller 402 for a vehicle that is not a hand truck, i.e., one that does not operate in a "tilted" mode, would monitor operation via a subset or superset of sensors described above and have different parameters for proper operation. As above, the hand truck is for explanatory purposes only.

FIGS. 6A and 6B represent a mode of operation 500 of the hand truck 200 in accordance with an aspect of the present disclosure. A payload 502, for example, a box, is set on the deck 204 of the hand truck 200. When at rest, the deck 204 is generally on the ground or surface 506 and a center of gravity (CG), sometimes referred to as the center of mass, of the combination of the hand truck 200 and the payload 502 is generally positioned somewhere above the deck 204, as shown in FIG. 6A.

When being used, the hand truck 200 is tilted back, assuming the deck 204 represents the "front," on the wheels 206 so that the hand truck 200 and the payload 502 can be moved more easily on the wheels 206. The "sweet spot" for using the hand truck 200 is that angle of tilt, relative to the horizontal, where the center of gravity CG is directly over the axis A-A of the wheels 206, e.g., in line with earth's gravity (g), as shown in FIG. 6B. As anyone who has ever used a hand truck knows, it is not easy to maintain that position and requires a user's hand be kept on the hand truck because tilting too far in one direction or the other, forward or backward, can result in either the payload 502 being spilled forward or the payload 502 falling backward onto the user.

Implementing self-balancing functionality on the hand truck 200 can aid in maintaining that balance so that the user has to provide substantially less force on the hand truck 200 to move and/or balance the hand truck 200. Such self-balancing and moving of heavy loads by the hand truck 200 are extremely useful when the user must push or pull the hand truck 200 up a grade such as found on a loading dock ramp.

Generally, the controller 402 receives data information from the sensors 408 such as the gyroscopes and the other sensors. This data is used by the controller 402 to provide output control signals that prevent the hand truck 200 from falling over by maintaining the balance of the CG over the axis A-A. In one embodiment, the controller 402 may utilize one or more microprocessors connected to one another by a data bus and having access to an on chip memory location and/or an off chip memory location for storing input and output data as well as calculation data for generating the output data.

The controller 402 calculates data based on measurements received from the sensors 408 and makes adjustments to the output data many times per second, e.g., hundreds or thousands of calculations per second. When the controller 402 detects that the CG is leaning forward, it directs the motors 404 to spin the wheels 206 forward in order to place the axis A-A under the CG and prevent the payload 502 from tilting forward. When the hand truck 200 leans in the aft direction, e.g., the CG is aft of the axis A-A, the motors 404 are directed to spin the wheels 206 in the aft direction to re-orient the axis A-A under the CG.

Thus, the controller 402 continuously balances the hand truck 200 to maintain the CG above the axis A-A due to its sampling of the sensors 408 that occurs many times per second. During that time of balancing, the hand truck 200 may appear to slightly "rock" back and forth, but within a very small area much like a rider balancing on a unicycle.

In one embodiment, the hand truck 200 may be brought to a static balance point (SBP) by the user and that point is saved by the self-balancing system controller 402 in a memory location and retrieved by the controller 402 in order to maintain the hand truck 200 at the pitch angle that places the CG over the axis A-A (shown in FIG. 4).

In another embodiment, the SBP is manually set by the user by tilting the hand truck 200 and payload 502 back to find the "sweet spot" of balance such that when the user's feeling of force applied on the tilted hand truck 200 is at a user perceived lightest point. At this point, the CG of the hand truck 200 and its current payload 502 is located directly over the axis A-A. A signal can be sent by the user to the controller 402 when the user is holding the hand truck 200 at the SBP. This indication could be, for example, through the input pad 214 on the hand truck 200, or through a button or switch, or the like. The controller 402 would then set the SBP as the orientation of the hand truck 200 that it will attempt to maintain.

The location of the SBP will depend on the characteristics of the payload 502, for example, how many components are stacked on the deck 204 and the mass of each. One can envision situations where multiple packages for delivery to a single location, for example, an office building, are stacked on the deck and where the arrangement of the packages determines the location of the CG and, therefore, the location of the SBP.

The SBP may be set with respect to the surface on which the deck 204 of the hand truck 200 is located at the time. Whether the deck 204 of the hand truck 200 is on a flat surface or a sloped surface, the SBP will be different for the same payload 502 if the surface changes. In any event, once set, the controller 402 will operate to maintain the SBP, and when balanced, the user may remove their hands from the hand truck's handle 208 and the hand truck 200 will balance the payload 502 in place. The user is then free to open doors, fill in paperwork, etc., without having to return the hand truck 200 and load to the upright position and then re-tilt back each time in order to move. By reducing the work of the hand truck user, the user can increase their productivity while reducing their chance of workplace injury.

If the SBP is set while on a level surface, the controller 402 will operate to maintain that orientation of the hand truck 200. If the hand truck 200 is urged forward by the user pushing on the handle, the CG will move forward and the controller 402 will respond by moving the wheels forward. As a result, the hand truck 200 will move forward while staying balanced in the tipped position. Of course, this will operate in an opposite manner if the user were to pull back on the hand truck. Thus, the system has reduced the amount of effort on the part of the user as the balance of the hand truck and its payload is now maintained by the controller 402.

Figure 7:
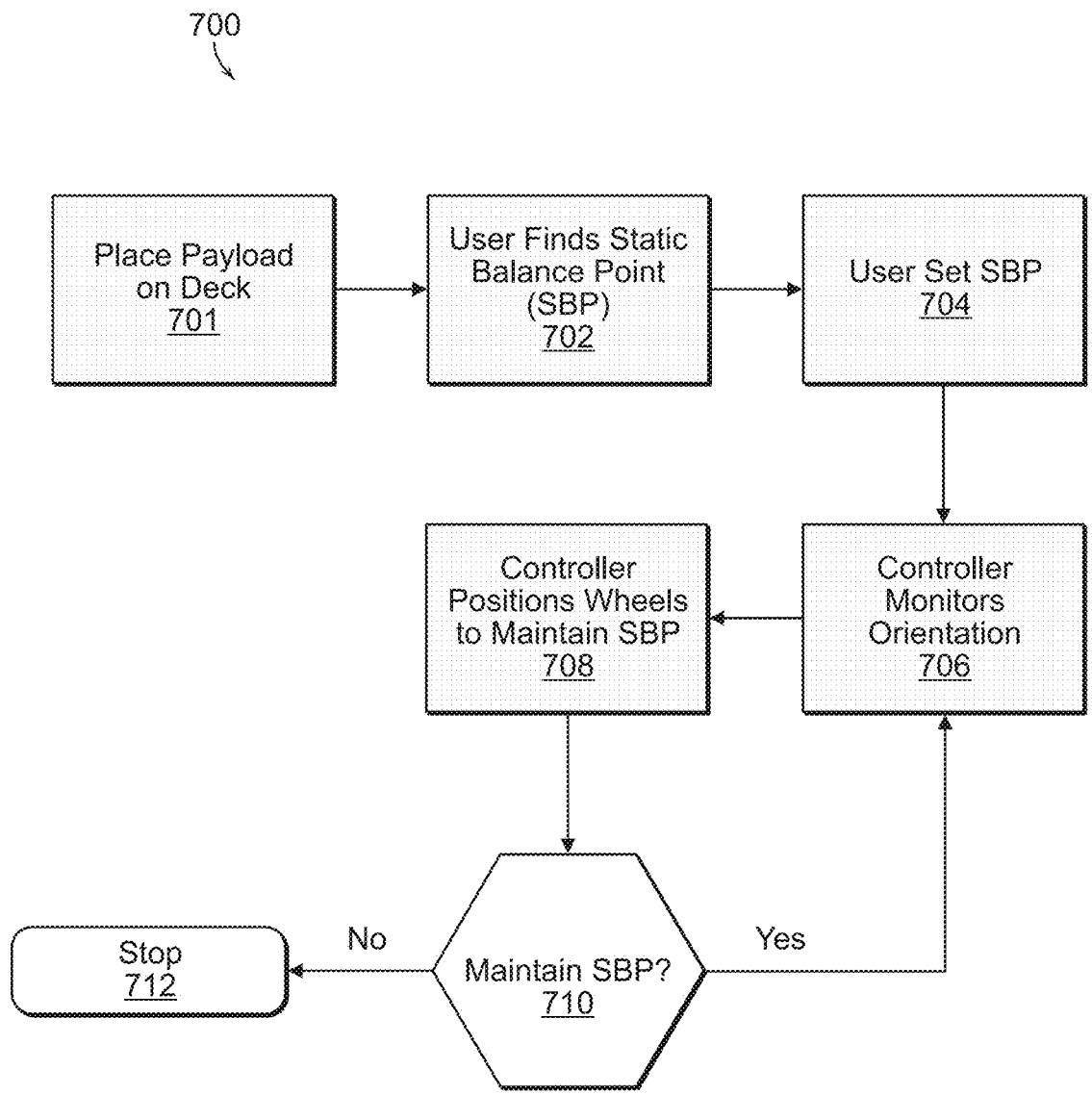
FIG. 7 is a flowchart of a method of operating a hand truck.

FIG. 7 is a flow chart of a method of operation 700 of a hand truck having two laterally disposed and powered wheels 206 that are positioned along a central axis A-A. Initially, step 701, the user places a payload on the deck of the hand truck and then finds the SBP, step 702. The user then can set the static balance point, step 704, by placing the center of mass directly above the central axis between the wheels. Setting the SBP includes using the controller to capture and store the SBP based on input signals from the orientation sensors and their resulting values that indicate the orientation of the frame relative to the surface at the time of the determination of the SBP. These values may be stored in a memory location that is accessed by the controller. Once the SBP is set, the controller monitors the sensors, step 706, and each motor is controlled to provide torque to the respective wheel to maintain the hand truck at the SBP, step 708. The process determines, step 710, whether to continue maintaining SBP and, if yes, then the controller monitors the hand truck's orientation, step 706, otherwise, the process stops, step 712.

When the user tilts the hand truck in a fore or aft direction each motor provides torque to the respective wheel to move the hand truck fore or aft, respectively, while maintaining the static balance point.

The hand truck can travel in a straight path and can also be turned. The user may cause the hand truck to turn by exerting a force to cause the hand truck to rotate or turn by urging the hand truck in the desired direction. The controller will sense this change and provide a first torque value to the first wheel and a second torque value to the second wheel to provide a yaw motion to the hand truck while maintaining the static balance point.

Alternatively, the user may indicate a turn through an input device, for example, a yaw controller implemented with a joy stick. The controller 402 will sense the signals from the joy stick and send the signals to the wheels to cause the hand truck to turn. The yaw controller may be input from a wireless device that connects to the hand truck by a wireless signal communication path.

In an alternate implementation, the SBP is sensed by the controller 402 when the force input, e.g., force measured at a joystick, force sensor or other control input device, is detected to be at a lowest level and then set by the system or indicated to the user to be set. Once determined, the system to maintain the SBP, e.g., the orientation of the hand truck, at that point per the operation of the controller and the torque values sent to the wheels.

Figure 8:
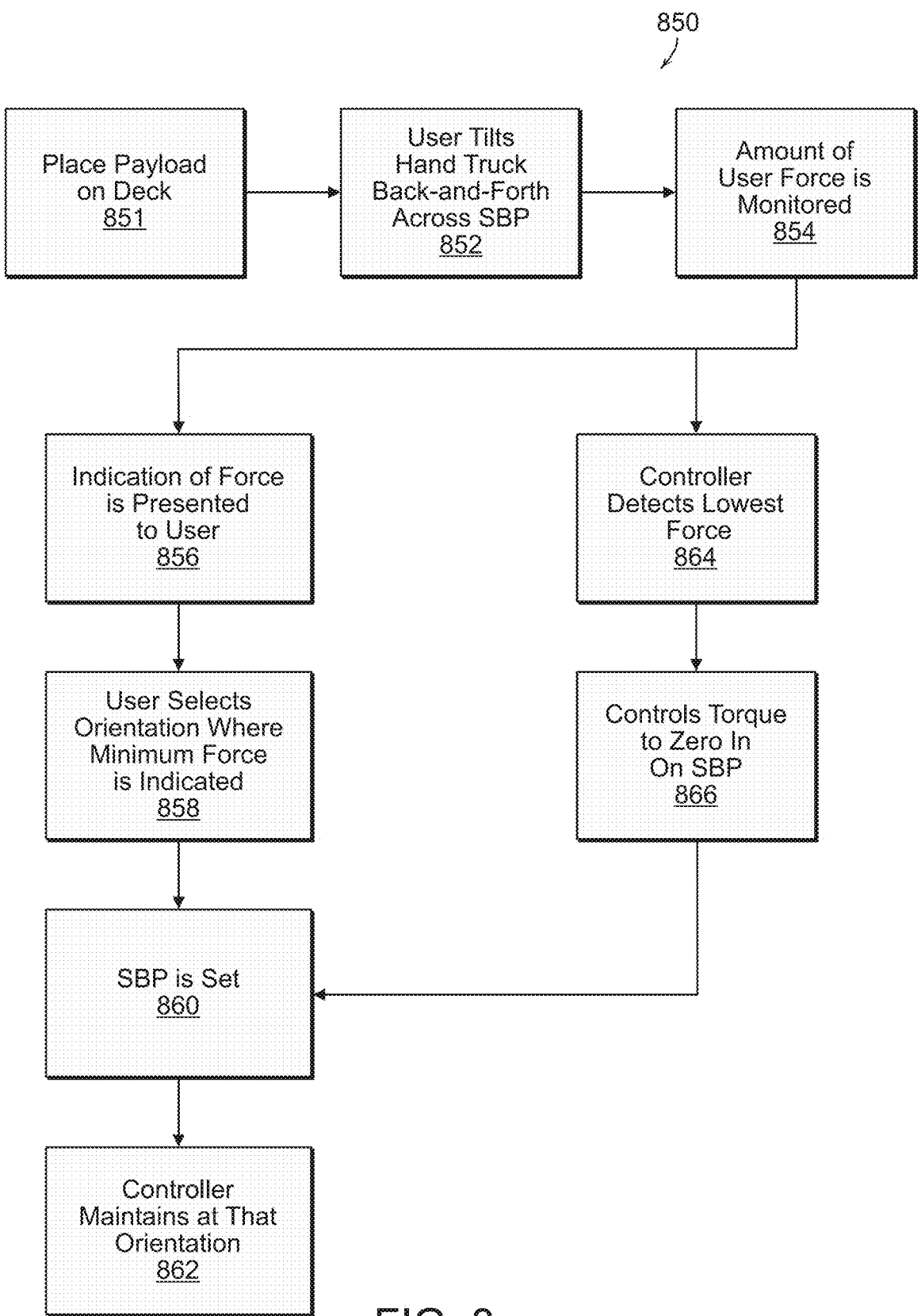
FIG. 8 is a flowchart of a method of operating a hand truck.

A method 850 of operating a hand truck in accordance with another aspect of the present disclosure is presented in FIG. 8. The user places, step 851, the payload on the deck and then tilts the hand truck back and forth attempting to locate the SBP, step 852. While the hand truck is being tilted back and forth, the controller is measuring, step 854, the amount of force being exerted by the user.

In one mode of operation, control passes to where the controller detects the user applied force, step 856, and provides the user with an indication of how much force is being used in order to give the user information as to when the SBP is being approached. This indication could be visual, for example, a positive or negative number where zero is the SBP, a light going from one color to another, a blinking light that goes from blinking to solid as the SBP is approached or it could be a "bubble level" icon. Alternatively, the notification could be a sound that changes, for example, pitch or beeps/second, as the SBP is approached. Of course, there are other ways of indicating the approach or attainment of SBP that would be understood by one of ordinary skill in the art. Further, there could be a combination of visual and aural indications.

The user indicates when they believe the hand truck is at the SBP, step 858, by pressing a button, touching an icon on a touch screen, or the like, and the SBP is set, step 860, such that the orientation values that indicate the orientation of the frame at the time of the determination of the SBP are stored. Subsequently, the controller operates to maintain, step 862, the hand truck at the orientation to keep the SBP.

In an alternate mode of operation, subsequent to, step 854, control passes to, step 864, where the controller detects the user force as the hand truck is being tilted back and forth. As the SBP is being zeroed in on, the controller sends torque commands, step 866, to the wheels to reduce the oscillation about the SBP and to, ultimately, choose and set the SBP without the user's input.

In one aspect of the present disclosure, the drive system 210 of the hand truck provides power to the wheels to limit or reduce an amount of work, or effort, exerted by the user to be less than a predetermined maximum amount without regard to the size of the load.

With known hand trucks, a user must do more work as the load increases. This is true even for a powered hand truck as the user must still control the load from tilting either too far forward or backward in order to prevent spilling the payload. While the motorized wheels of known powered hand trucks will move the hand truck, the amount of the load still affects the effort needed from the user to maintain the balance, i.e., the tilt, to make the hand truck function.

In one aspect of the present disclosure, the system measures the amount of effort the user is exerting while controlling the hand truck. The effort can be measured as force, torque, work, etc. If the amount of effort exceeds a predetermined threshold, more torque is provided to the wheels until the effort needed by the user is at or below the threshold. The system thus modifies its power output to the wheels to ensure that the user is maintaining an input below the threshold. This limit is set whether the hand truck is being urged either fore or aft by the user.

For example, the system can be set such that the user only ever needs to exert a maximum predetermined force, e.g., five (5) pound-feet (lb-ft) on the handle, and the controller 402 will modulate power to the wheels 206 to maintain this level. If the user starts up a hill and the controller 402 detects the user is now pushing more than 5 lb-ft then more torque is provided to the wheels until the amount of torque provided by the user is less than the set limit. The limit can be set for the hand truck or programmed for a particular user. As used in the present disclosure, a pound-foot (lb-ft) is a unit of torque where one pound-foot is the torque created by one pound of force acting at a perpendicular distance of one foot from a pivot point.

Advantageously, this control reduces the chances for injury to a user as well as allows a user to move larger loads than those that could be done with known hand trucks.

Figure 9:
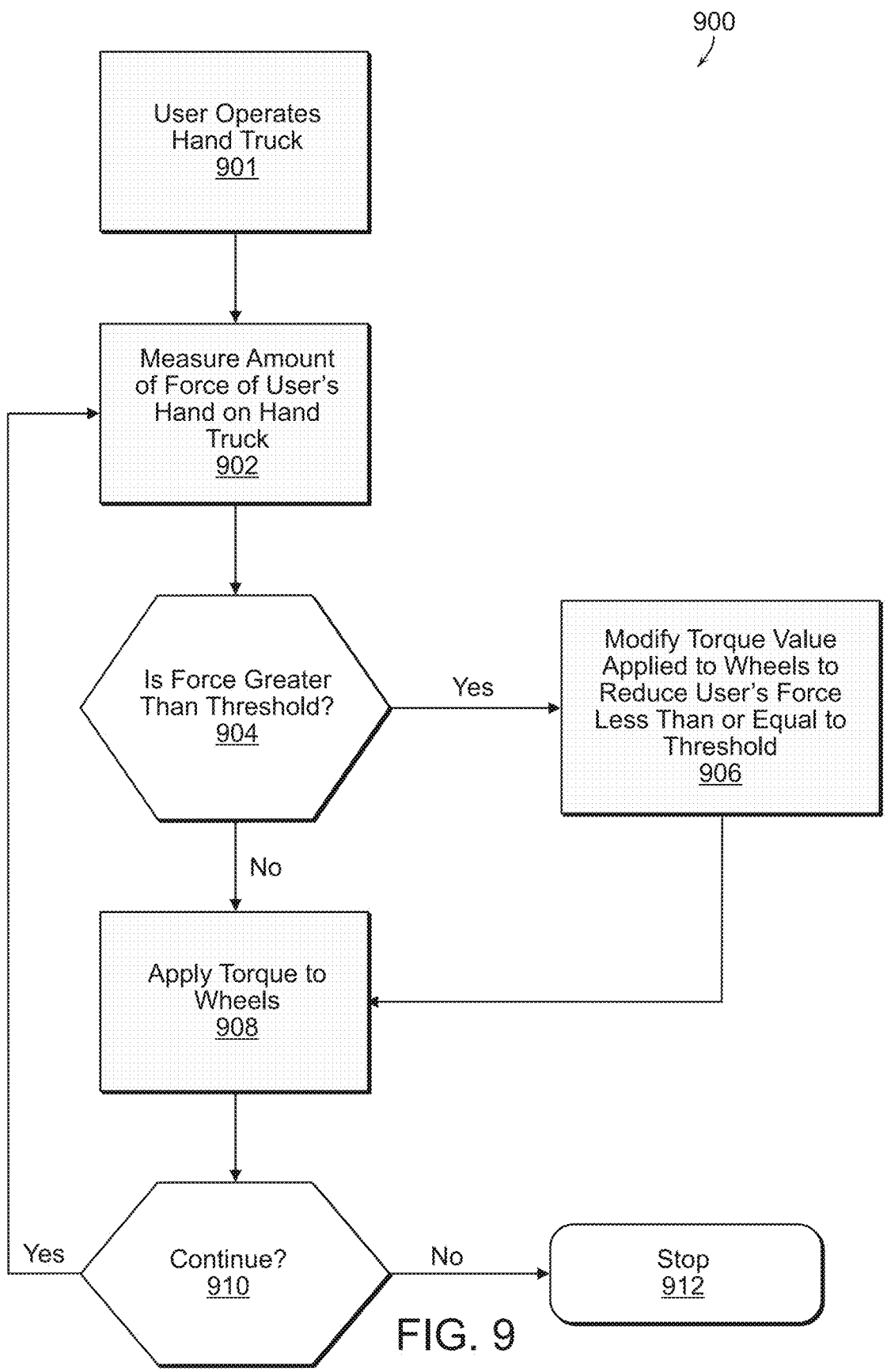
FIG. 9 is a flowchart of a method of operating a hand truck.

FIG. 9 is a flowchart of a method of operation 900 of a hand truck. Initially, the user operates the hand truck, step 901, and the controller measures, step 902, a force applied by the user to the hand truck. The measured force includes a direction and a magnitude where the latter is compared, step 904, to a predetermined threshold. If the magnitude threshold is exceeded, control passes so that the torque value to the wheels is modified, step 906, to reduce the amount of force being applied by the user and that torque amount is applied to the wheels, step 908. The torque is provided to each wheel to rotate in a respective direction as a function of the measured magnitude and direction. Thus, the hand truck can be turned if commanded to by the user. If the process is to continue, step 910, control passes back to the controller measuring the amount of force used by the user, step 902, and the process repeats. If the process does not continue, step 910, the process ends, step 912.

If the measured force is below the threshold at, step 904, then processing passes to where the torque value(s) applied to the wheels, step 908, and the force need not be modified to reduce the amount of effort on the part of the user.

In one implementation, the torque to each wheel is provided such that the magnitude of force applied by the user is maintained to not exceed the predetermined value.

The force applied by the user may be measured by a force sensing module, e.g., a piezoelectric device, a Hall effect device, the force sensor described below or the like.

Figure 10:
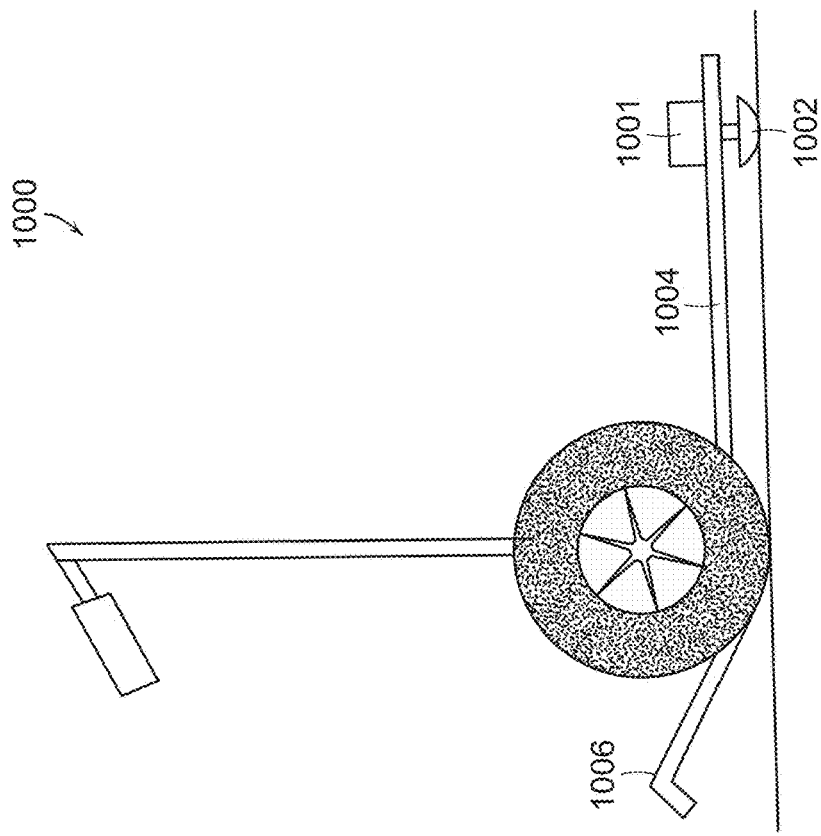
FIG. 10 is a side view of a hand truck.

FIG. 10 is a side view of a hand truck 1000. A ram linear actuator 1001, or the like, provides assistance in positioning the hand truck into the SBP position. Advantageously, the actuator 1001 lowers an amount of effort required from the user to start the initial lean, usually back toward the user, of the hand truck from the upright starting position to the useable pitched back position, i.e., the SBP. Further, in the reverse fashion, this actuator allows for a controlled descent from the pitched state to the upright position. The actuator can be provided to allow the hand truck to rest on the reverse side, i.e., the aft side of the hand truck, for static support to allow the user to pitch the hand truck back and rest it onto this extended support to hold at a desired pitch angle.

Figure 11:
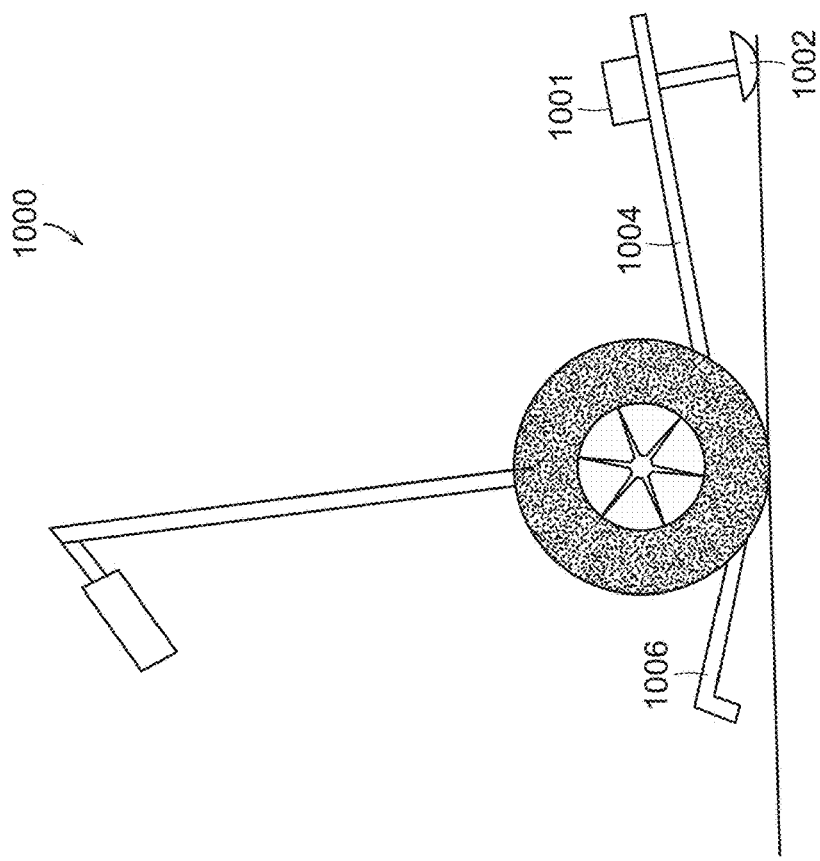
FIG. 11 is a side view of a hand truck.

In FIGS. 10 and 11, the ram 1001 is provided with an extendible pad or foot 1002 provided on the lower portion, or underside, of the deck 1004. In operation, the pad extends to raise the deck 1004 and tilt the payload (not shown), backward, that is, in the aft direction. The amount of force with which the pad 1002 extends may vary but could be enough to allow the user to "catch" the hand truck and find the balance point to be set, as set forth above. The ram/actuator 1001 is coupled to the controller 402 and receive commands from the controller 402 to coordinate operation with the operation of the wheels in controlling the orientation of the hand truck.

In an alternate implementation, the ram 1001 may be set to launch the pad 1002 with sufficient force to move the CG of the hand truck and payload to a point near the SBP at which point the controller would command torque to the wheels to find and set the balance point.

In another embodiment, at least one aft-positioned limit arm 1006 is provided to prevent the hand truck from tipping back too far. Two aft limit arms may be provided in a modified version as well.

The ram 1001 may be telescopic and hydraulic or pneumatic-based. Alternatively, it may extend by operation of a threaded rod or a similarly operating mechanism as would be understood by one of ordinary skill in the art.

In the event of a low battery condition, the control system notifies the user via sound, visual alerts, etc., when the battery has reached a predetermined threshold, for example, 10%, 25%, or 35%, of full capacity remaining, although any level can be set, before powering down. This notification allows the user to move the hand truck and the load to a safe area and also allows the user to plan ahead if the battery is getting down to near the predetermined threshold. A mechanical brake can also be disengaged when the power is on and held open under power, and that is automatically closed when the power is cut. This ensures that if the machine loses power then the wheels will lock ideally causing minimum movement or braking movement if the hand truck is on an incline.

In one implementation, the controller may move the hand truck from the position where the SBP is being maintained into the stable position where the deck is on the ground. This re-orientation of placing the deck on the ground could be implemented with or without the use of the ram in order to bring the deck down under control and without spilling the payload. Alternatively, the torque of the motors may be sufficient to bring the hand truck to rest if there is a minimal, or no, payload present. The controller may use the ground sensor to determine when the deck has touched down.

Figure 13:
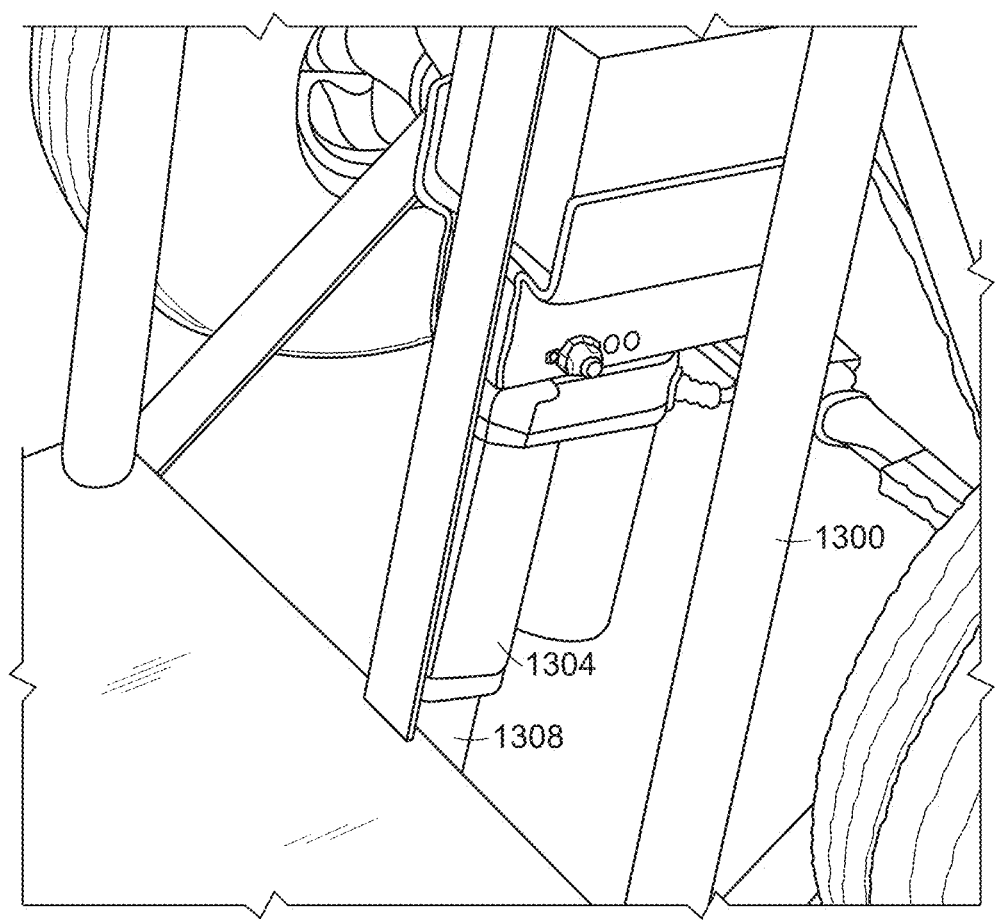
FIG. 13 is perspective view of a hand truck.
Figure 14:
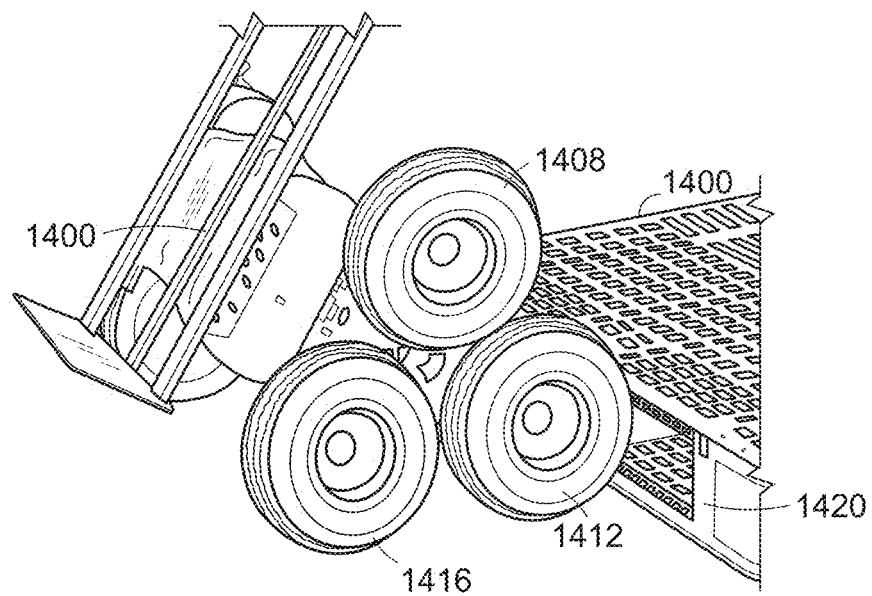
FIGS. 14-17 are perspective views of a hand truck with wheel clusters.
Figure 15:
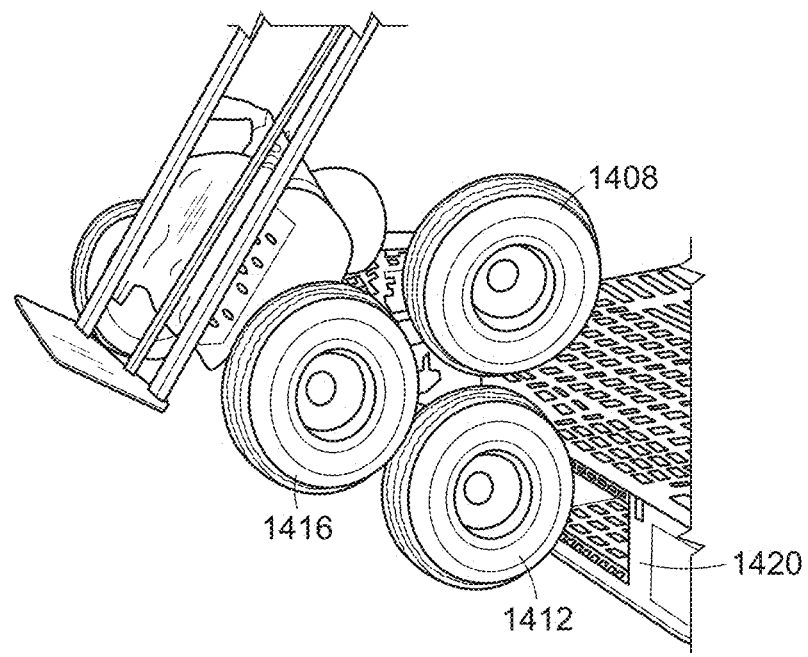
Figure 16:
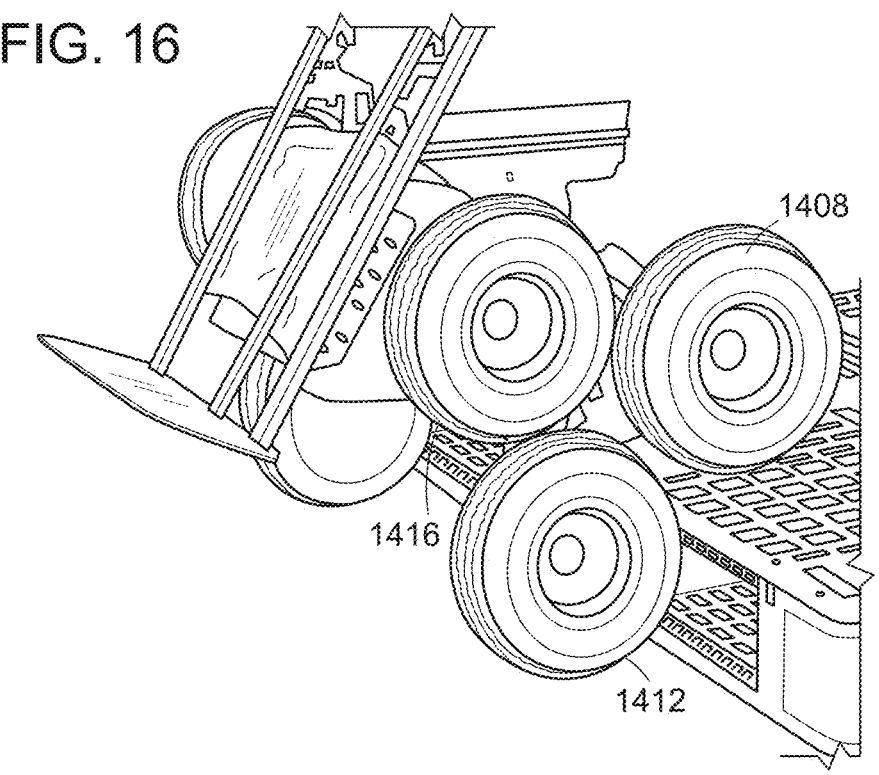
Figure 17:
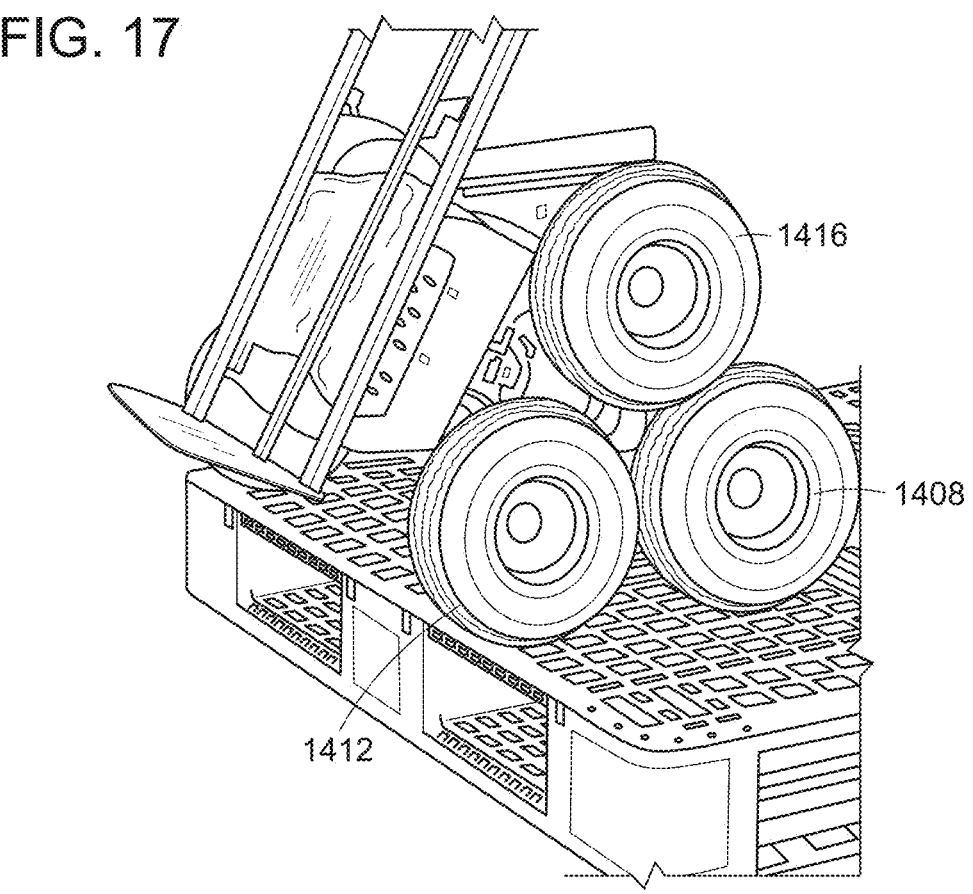

FIG. 13 is a perspective view of a hand truck in accordance with an aspect of the present disclosure. As shown, the hand truck 1300 includes a linear motor 1304 positioned on the frame at the back of the deck and centered, with respect to the width of the deck. A rod 1308 can be extended and retracted from the linear motor 1304 under control of the user to aid in tilting back the hand truck and in bringing the deck to rest. This reduces the amount of effort needed by the user especially when heavier payloads are placed on the deck.

FIGS. 14-17 are perspective views of a hand truck with wheel clusters in accordance with an aspect of the present disclosure. As shown, the hand truck 1400 includes opposed wheel clusters 1404. The wheel cluster 1404 includes three wheels 1408, 1412, 1416. In operation, when the hand truck 1400 encounters a step 1420, the wheels 1408, 1412, 1416 rotate to lift the hand truck 1400 onto the step 1420 without the need for the user to lift the hand truck 1400 and its payload. This reduces the amount of effort needed by the user and can reduce the chances of the user being injured in attempting to lift too heavy a payload.

Figure 18:
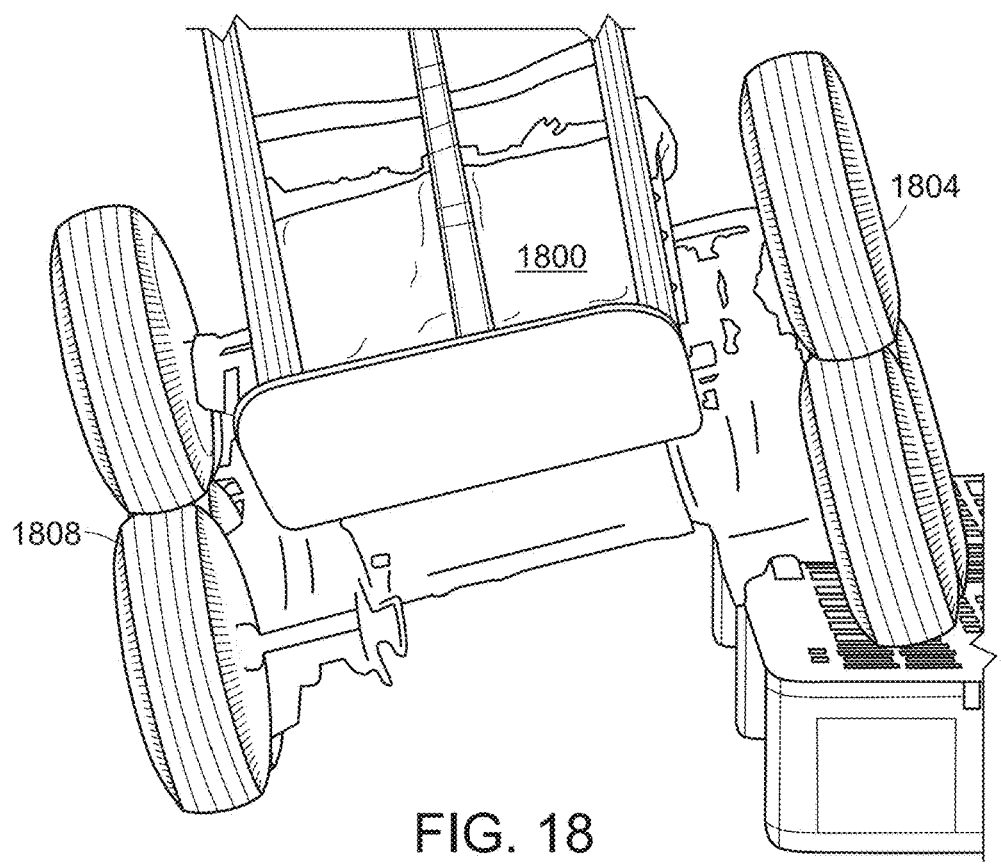
FIGS. 18 and 19 are perspective views of a hand truck with separately configurable wheel clusters.
Figure 19:
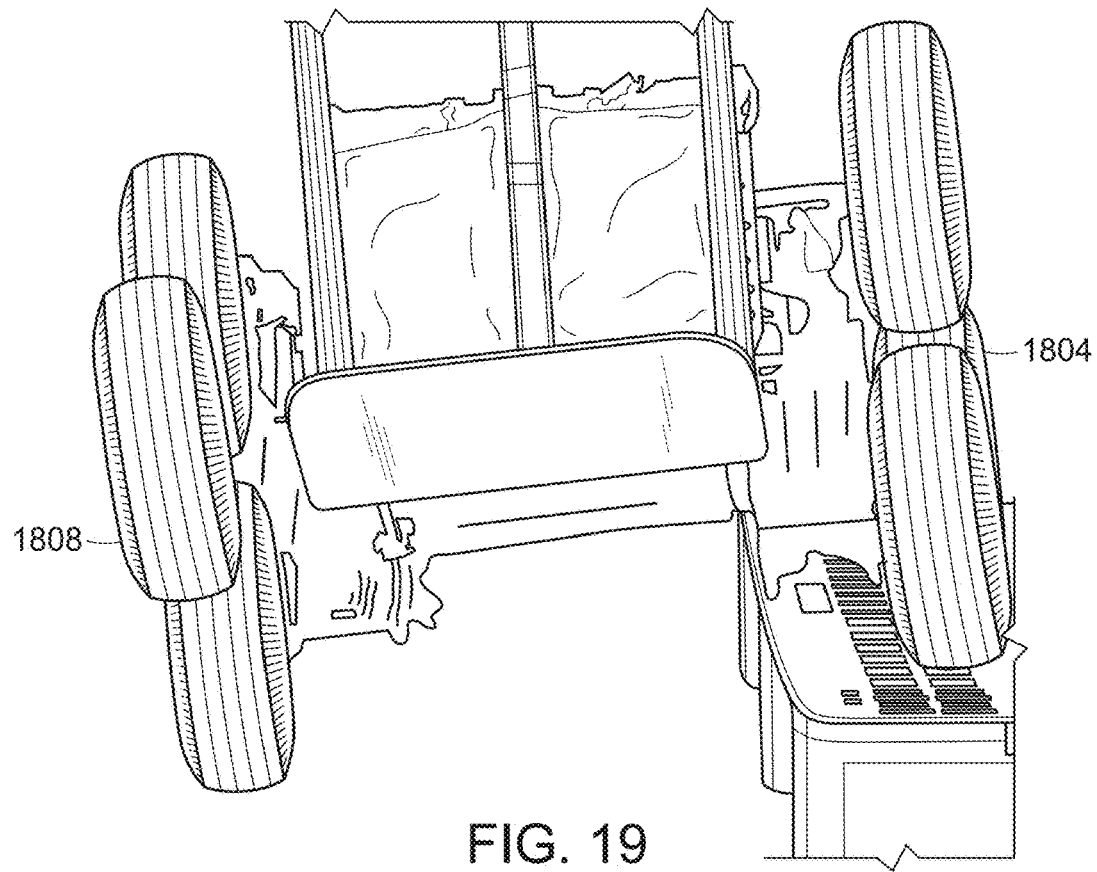

FIGS. 18 and 19 are perspective views of a hand truck with separately configurable wheel clusters in accordance with an aspect of the present disclosure. As shown, the hand truck 1800 has two wheel clusters 1804, 1808, each having three wheels. In operation, the hand truck 1800 may encounter a lateral incline where, for example, the wheel cluster 1804 is "uphill" from the wheel cluster 1808, thus placing the payload at a "roll angle." This is an awkward condition for the user and may lead to the spilling of the payload. To compensate for the incline, the wheels in the "downhill" cluster 1808 are rotated, as shown in FIG. 19, such that one wheel is on the ground surface instead of two, in order to level out the deck and the payload.

Figure 20:
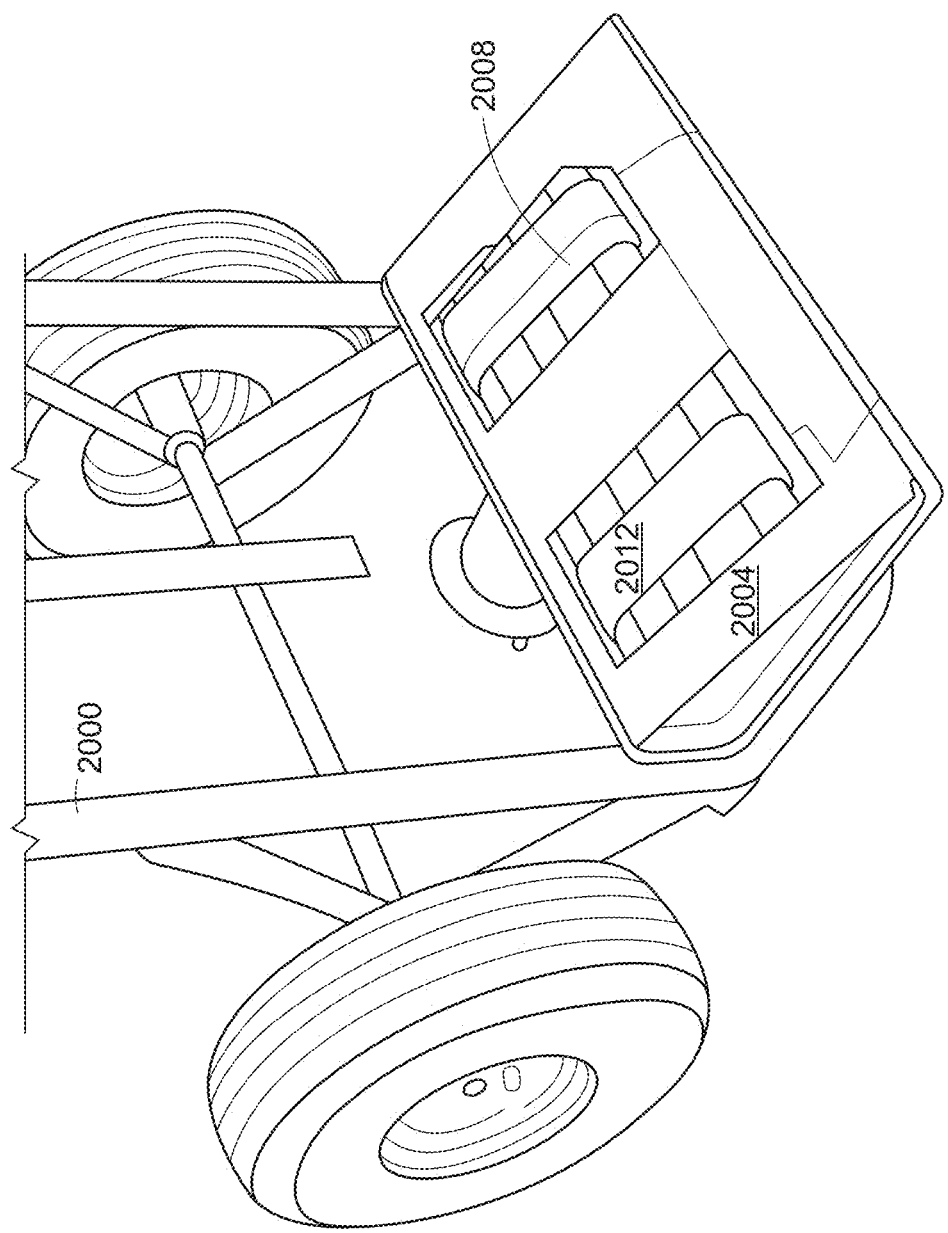
FIG. 20 is a perspective view of a hand truck with a conveyor belt on the deck.

FIG. 20 is a perspective view of a hand truck with a conveyor belt on the deck in accordance with an aspect of the present disclosure. As shown, the hand truck 2000 includes a deck 2004 that has two conveyor belts 2008, 2012, powered by a motor (not shown) under control of the user. The conveyor belts 2008, 2012 rotate to either pull the payload onto the deck 2004 or remove the payload from the deck for delivery. The belts may be made from a material that is able to grip the payload without damaging the packaging. The conveyor belts 2008, 2012 reduce the amount of effort required by the user to load and unload material on the deck 2004 thus reducing the chances of injury to the user.

Figure 21:
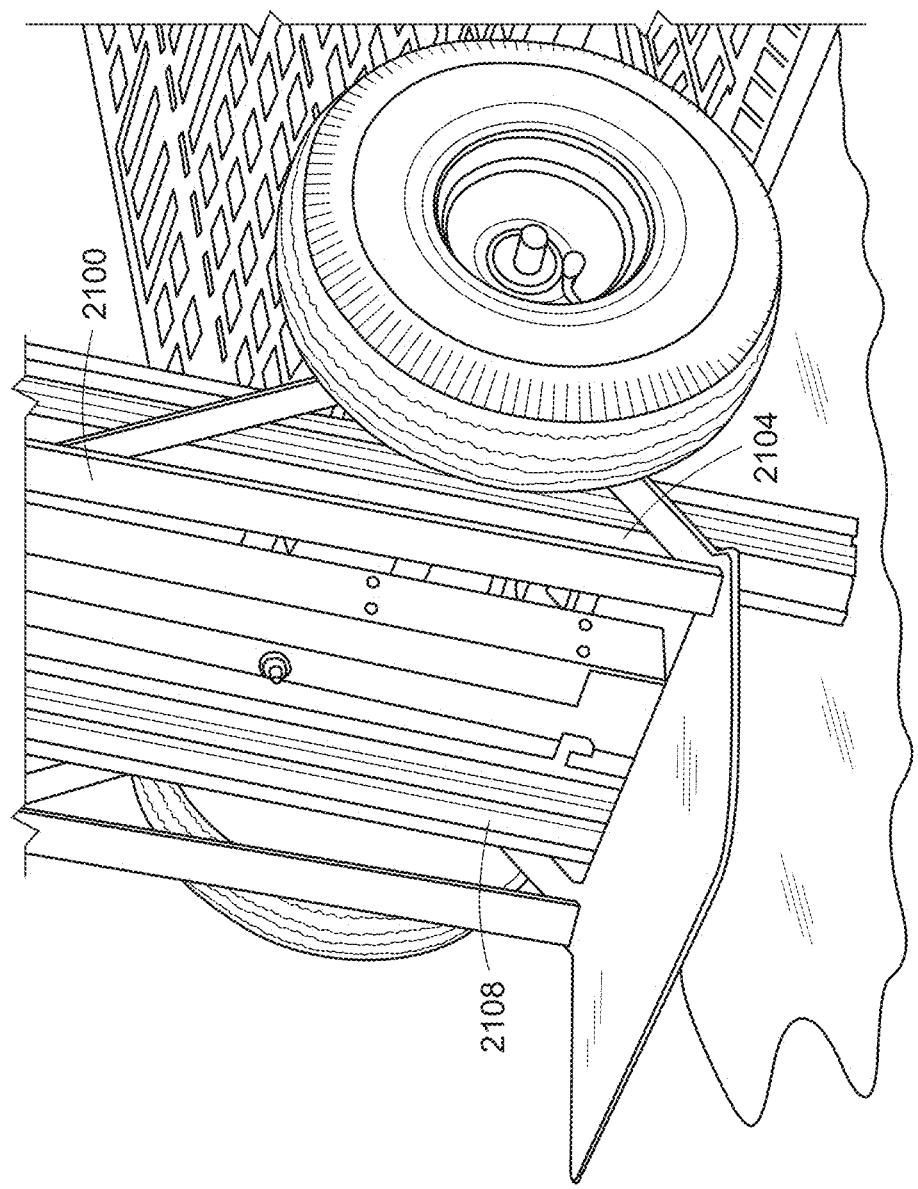
FIGS. 21-23 are perspective views of a hand truck with a lift mechanism.
Figure 22:
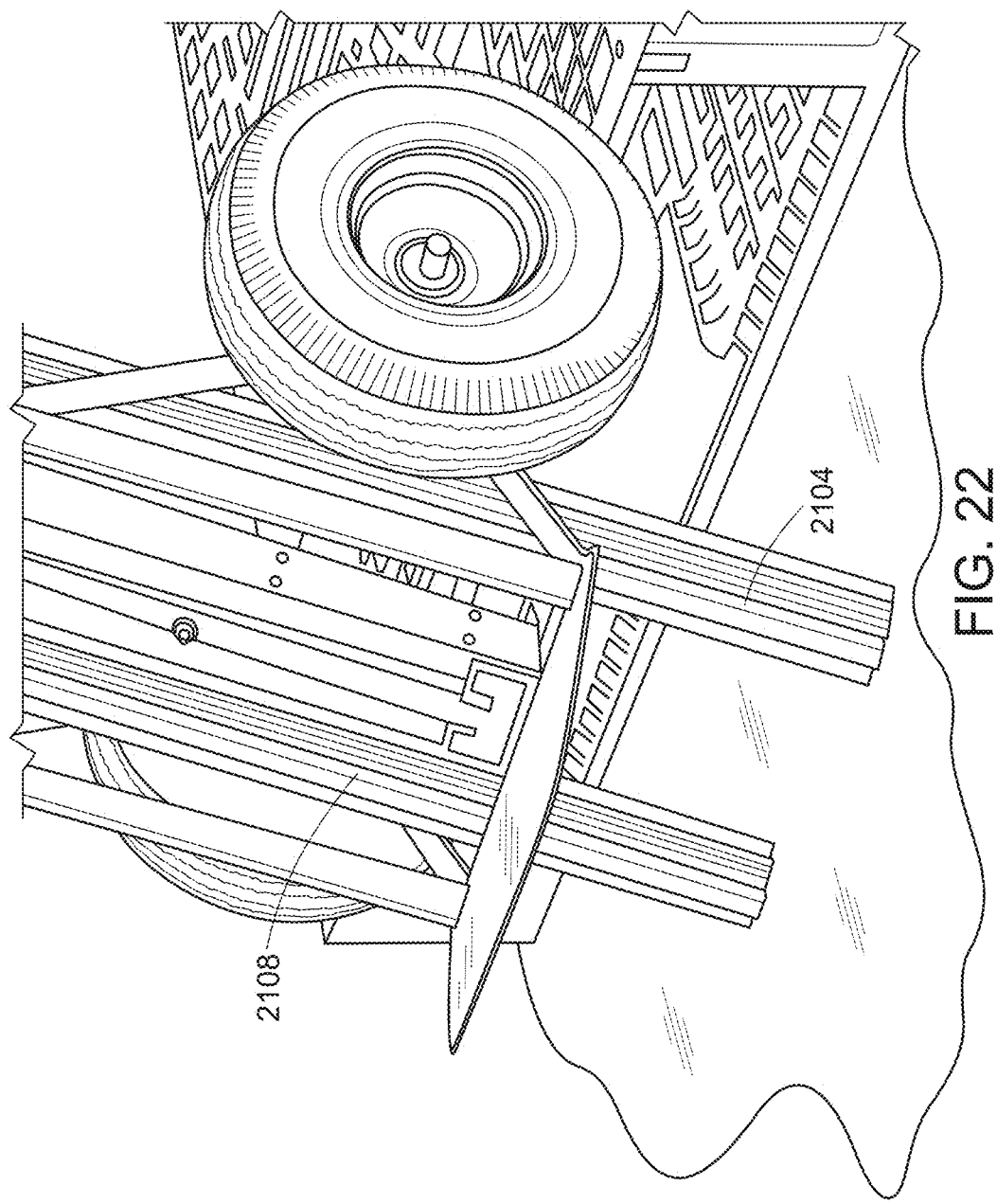
Figure 23:
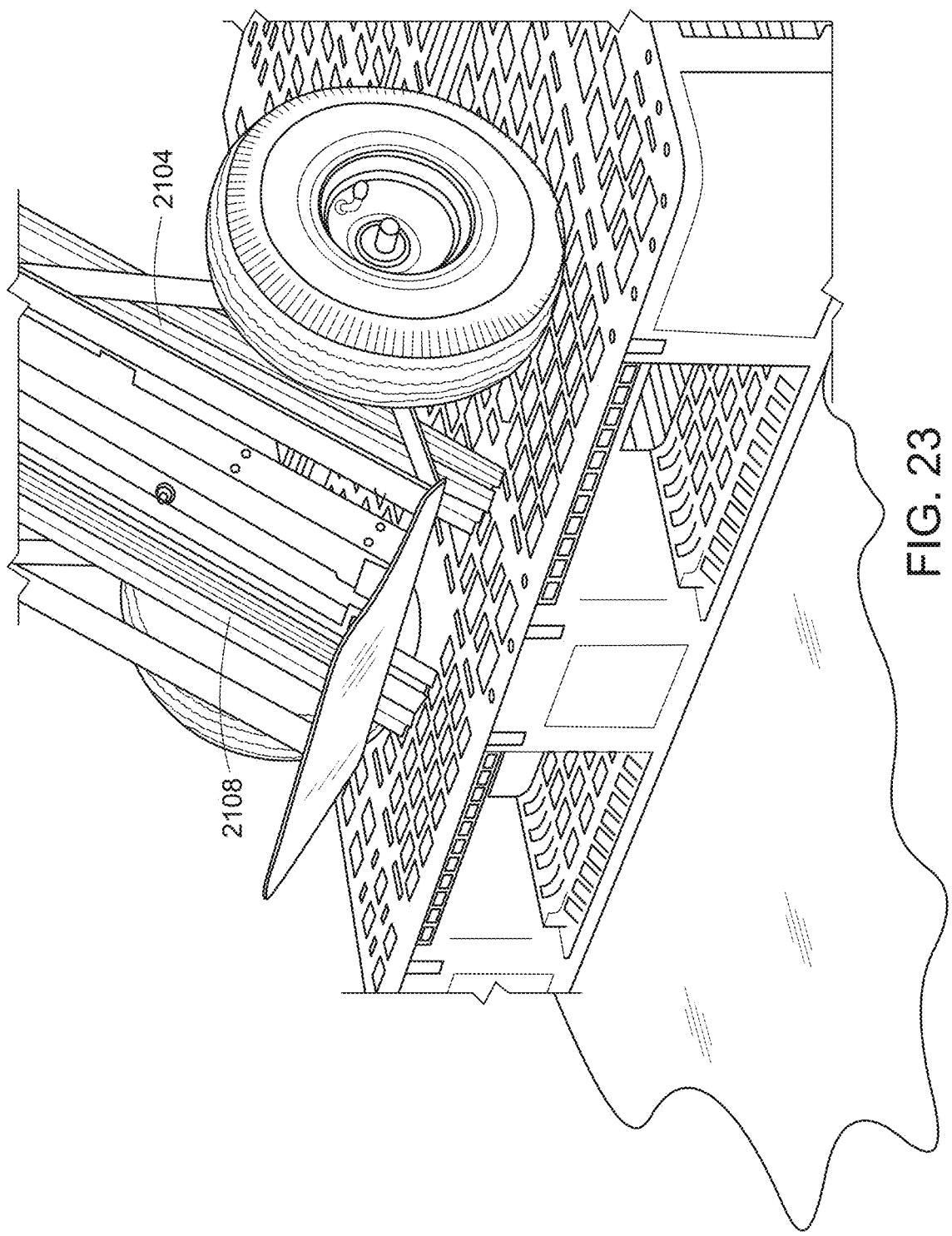

FIGS. 21-23 are perspective views of a hand truck with a lift mechanism in accordance with an aspect of the present disclosure. The hand truck 2100 includes two linear rods 2104, 2108 that are extendible by, for example, a linear motor (not shown). The rods 2104, 2108, when extended, raise the hand truck 2100 off the surface so that it may be positioned at a next level, for example, a stairway step or threshold, without the need for the user to lift the combination of the hand truck 2100 and the payload. Once located at the next level, as shown in FIG. 23, the rods 2104, 2108 are retracted and the hand truck 2100 is moved to its destination.

Figure 24:
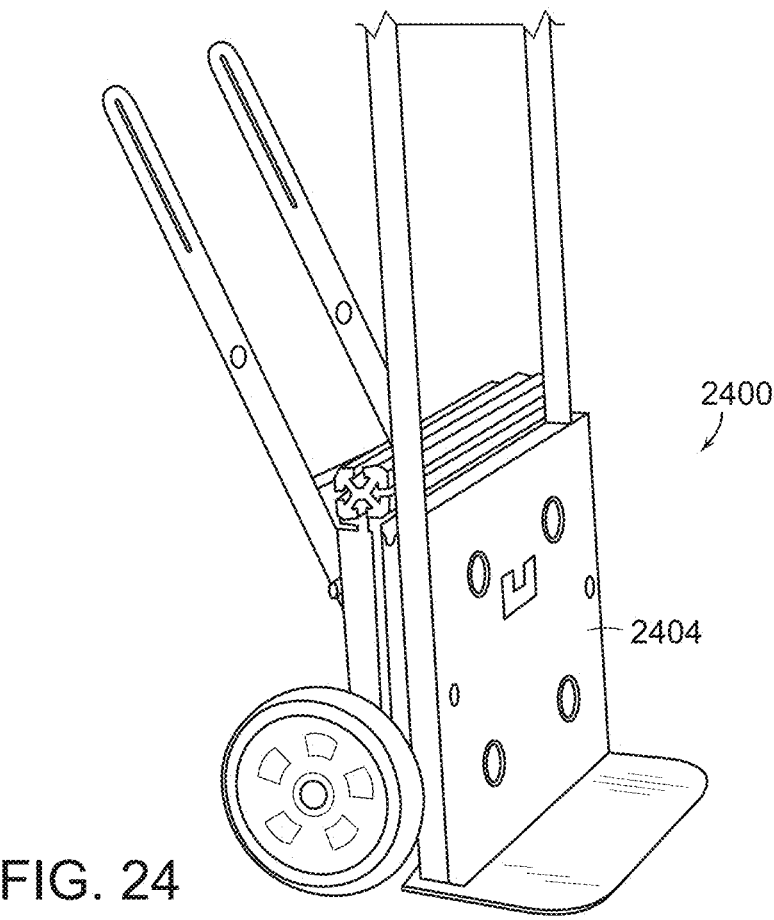
FIGS. 24 and 25 are perspective views of a hand truck with an unload assist mechanism.
Figure 25:
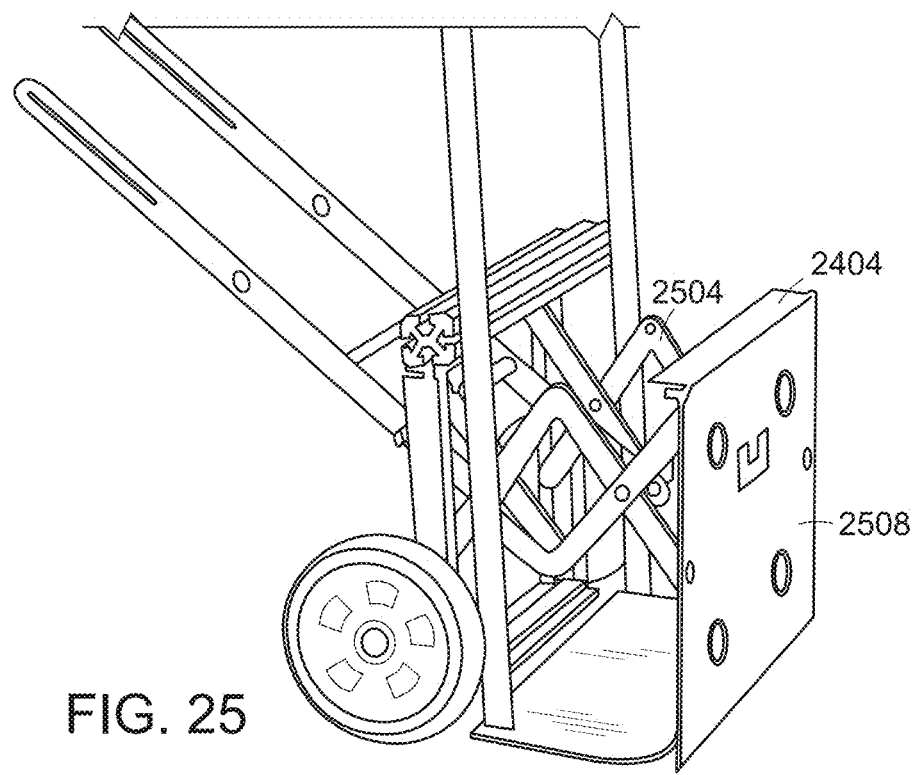

FIGS. 24 and 25 are perspective views of a hand truck with an unload assist mechanism in accordance with an aspect of the present disclosure. The hand truck 2400 includes an unload assist mechanism 2404 that pushes the payload off of the deck. As shown in FIG. 25, the unload assist mechanism 2404 includes a scissor assembly 2504 to extend a pusher plate 2508 against the payload for unloading that is then retracted when finished. The unload assist mechanism 2404 may be manually operated or powered by any one of a number of approaches as would be known by one of ordinary skill in the art.

Figure 26:
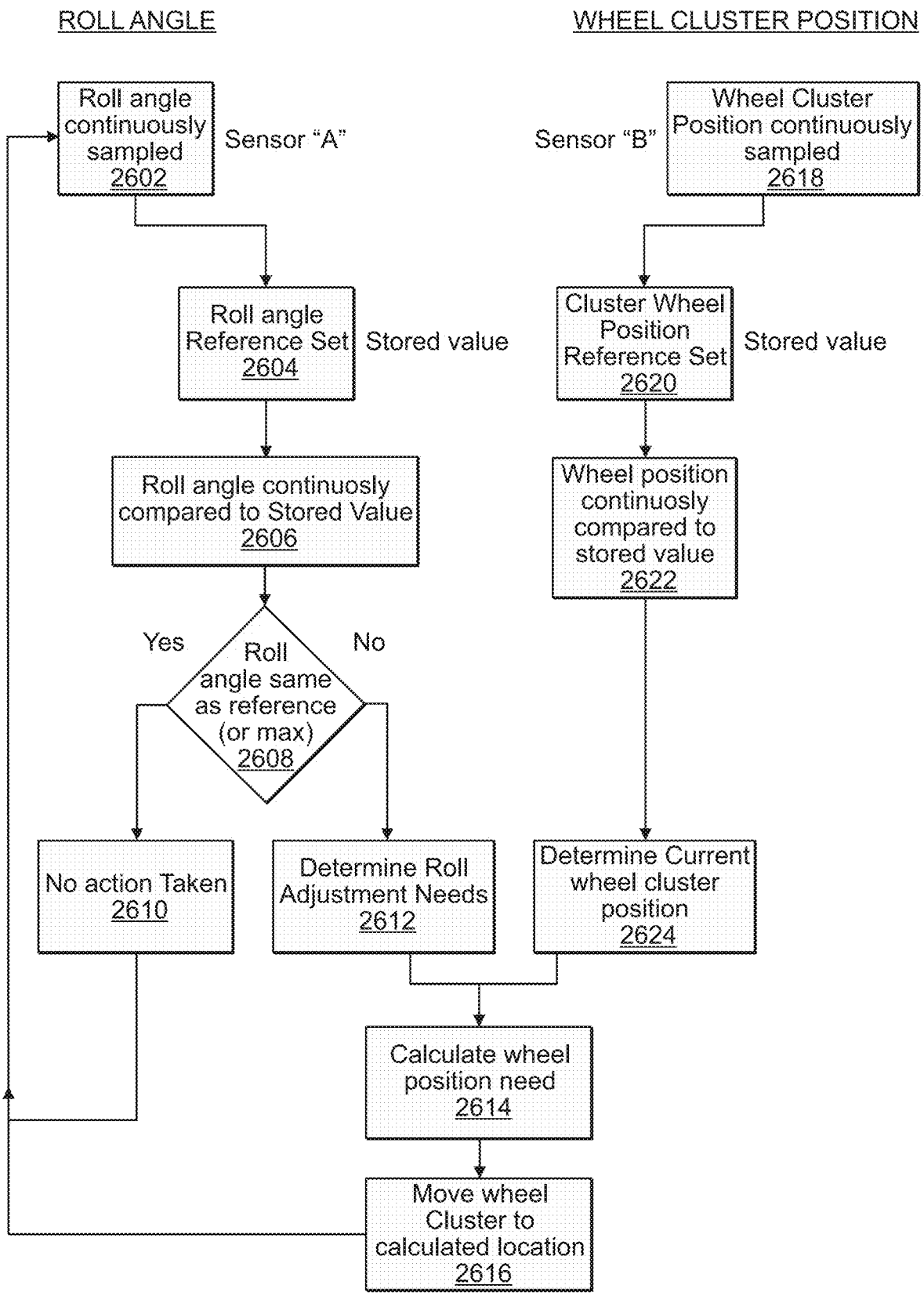
FIG. 26 is a flowchart of a method of operating a hand truck.

FIG. 26 is a flowchart of a method of operating a hand truck to compensate for the roll angle as discussed above with respect to FIGS. 18 and 19. Thus, the roll angle is continuously sampled, step 2602, and a roll angle reference value is set, step 2604. The sampled roll angle value is continuously compared to the stored value, step 2606, and if it is the same as the reference, step 2608, then no action is taken, step 2610. If, however, the roll angle is not the same then the needed roll adjustment is determined, step 2612, the necessary wheel position is calculated, step 2614, and the wheel cluster is moved to the calculated location, step 2616.

While the roll angle is being sampled, the wheel cluster position is being continuously sampled, step 2618, and the cluster wheel position reference is set, step 2620. The cluster wheel position is continuously compared to the stored position reference, step 2622, and current wheel cluster position is determined, step 2624.

It should be noted that the foregoing aspects discusses with respect to FIGS. 13-26 can be implemented on a hand truck or vehicle that also implements the methods of operation and associated structure described with respect to FIGS. 2-12.

In one mode of operation of the hand truck in accordance with an aspect of the present disclosure, the user commands forward/reverse operation of the motors using an input device. This motor control can be mapped in a linear, progressive, etc., ratio. The input device can be a thumb-wheel or a push/pull interface that may be intuitive to operate. The push/pull interface would allow the hand truck to be used in a standard manner but still have torque assistance. This torque assistance can be skewed based on user input and preset levels for minimum/maximum assistance based on the user's profile.

In one mode of operation of the hand truck in accordance with an aspect of the present disclosure, the user commands forward/reverse operation of the motors using the pitch angle of the hand truck. The hand truck can be set to the neutral balance point by pitching it back until the hand force is lightest at which point the balance mode can be engaged. The balance point can be biased as pitched forward or backward to provide a biased assistance. This biased assistance is achieved by setting the balance point forward or backward of the neutral balance point. If the user lets go of the hand truck it will tend to move in the direction of the set bias. This allows the user to, if desired, allow the machine to hold on slopes or descend/climb slopes with very little, to no, hand force input necessary.

In one mode of operation of the hand truck in accordance with an aspect of the present disclosure, the user commands forward/reverse operation of the motors using an input force from the hand or a sensor to initiate forward movement. To accelerate forward, the hand truck will momentarily be brought back to initiate lean that will then allow forward acceleration. Reverse acceleration will be accomplished in a similar manner. This allows the user to be de-coupled from the pitching platform. This mode differs from pitch mode as the user is not controlling the pitch but is commanding forward or reverse movement. The hand truck is dictating the pitch values for the corresponding user input.

In one mode of operation of the hand truck in accordance with an aspect of the present disclosure, the user controls right and left yawing, i.e., turning, utilizing an input device. This motor control can be mapped as one of a linear, progressive, etc., ratio. The yaw control can also be incorporated to allow the user to tilt the machine left or right without having to command an input device.

In one mode of operation of the hand truck in accordance with an aspect of the present disclosure, the motor controller is set to send a "0" velocity signal to the wheels and will oppose the user in whatever direction the user is trying to direct the hand truck. This feature effectively causes the hand truck to want to hold its position and can be used to slow the speed when proceeding down an incline if so commanded. This "friction" mode can be configured to set a desired amount of "drag" in a set mode or coupled to a selectable switch for adjustability on the fly. This can be viewed as an electronic brake system that is set to a predetermined level by the user.

Figure 27:
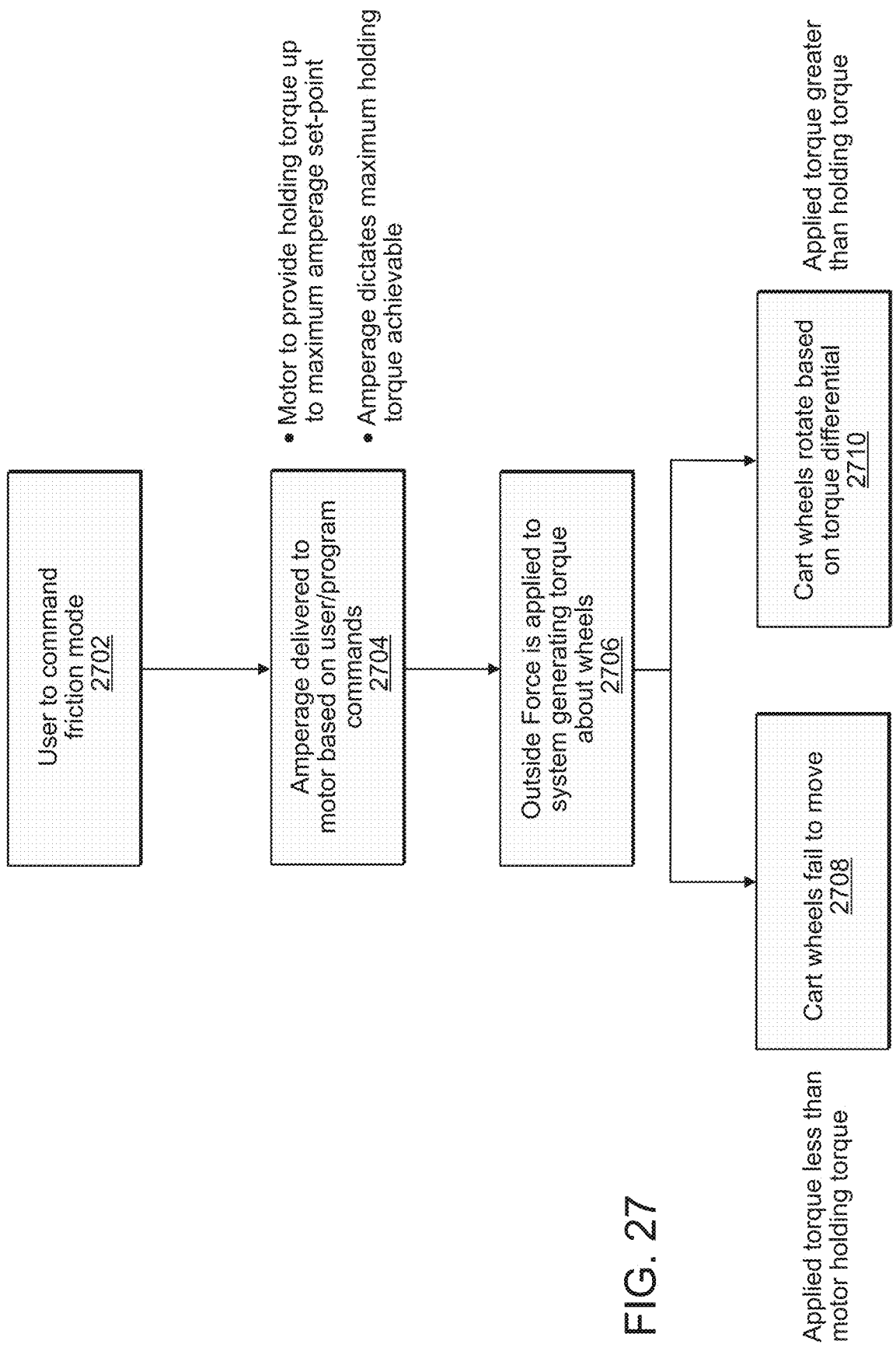
FIG. 27 is a flowchart of a method of operating a hand truck.

Referring to FIG. 27, a method of operation in the friction mode has the user commanding the friction mode, step 2702, and current is delivered to the motor based on the user/program commands, step 2704. When an outside force is applied to the hand truck generating torque about the wheels, step 2706, then either the hand truck wheels will not move because the applied torque is less than the motor holding torque, step 2708, or the wheels will rotate based on the torque differential, step 2710.

In one mode of operation of the hand truck in accordance with an aspect of the present disclosure, no torque is commanded toward the wheels. This allows the hand truck to be pushed like a non-powered hand truck and can also be utilized when the hand truck is not powered.

In one mode of operation of the hand truck in accordance with an aspect of the present disclosure, the hand truck is driven forward when it is detected that the hand truck is being tilted backward in order to ease the amount of user effort needed to tilt back when carrying a large payload. Similarly, when setting the hand truck down, operation is opposite in that the wheels are reversed to set down the payload to provide a controlled setting down. This reduces the required force to tilt the hand truck back and forth.

The various implementations of the above-described systems and methods described herein may be provided in digital electronic circuitry, in computer hardware, firmware, and/or software. An implementation can be as a computer program product, e.g., a computer program tangibly embodied in an information carrier. The implementation can, for example, be in a machine-readable storage device, for execution by, or to control the operation of, a data processing apparatus. The implementation can, for example, be a programmable processor, a computer, and/or multiple computers.

The above-described implementations generally depict a computer implemented system employing at least one processor executing program steps out of at least one memory to obtain the functions herein described. It should be recognized that the presently described methods may be implemented via the use of software, firmware or alternatively, implemented as a dedicated hardware solution such as an FPGA (field programmable gate array) and/or an ASIC (application specific integrated circuit). Modules, subroutines, and software agents can refer to portions of the computer program, the processor, the special circuitry, software, and/or hardware that implements that functionality.

A computer program can be written in any form of programming language, including compiled and/or interpreted languages, and the computer program can be deployed in any form, including as a stand-alone program or as a subroutine, element, and/or other unit suitable for use in a computing environment.

The display can be a liquid crystal display (LCD) or the like. The interaction with a user can, for example, be a display of information to the user and a keyboard and a pointing device, e.g., a mouse, touch pad or a trackball, by which the user can provide input to the computer. Other kinds of devices can be used to provide for interaction with a user, for example, by providing sensory feedback, e.g., visual feedback, auditory feedback or tactile feedback. Input from the user can, for example, be received in any form, including acoustic, speech and/or tactile input.

Figure 12:
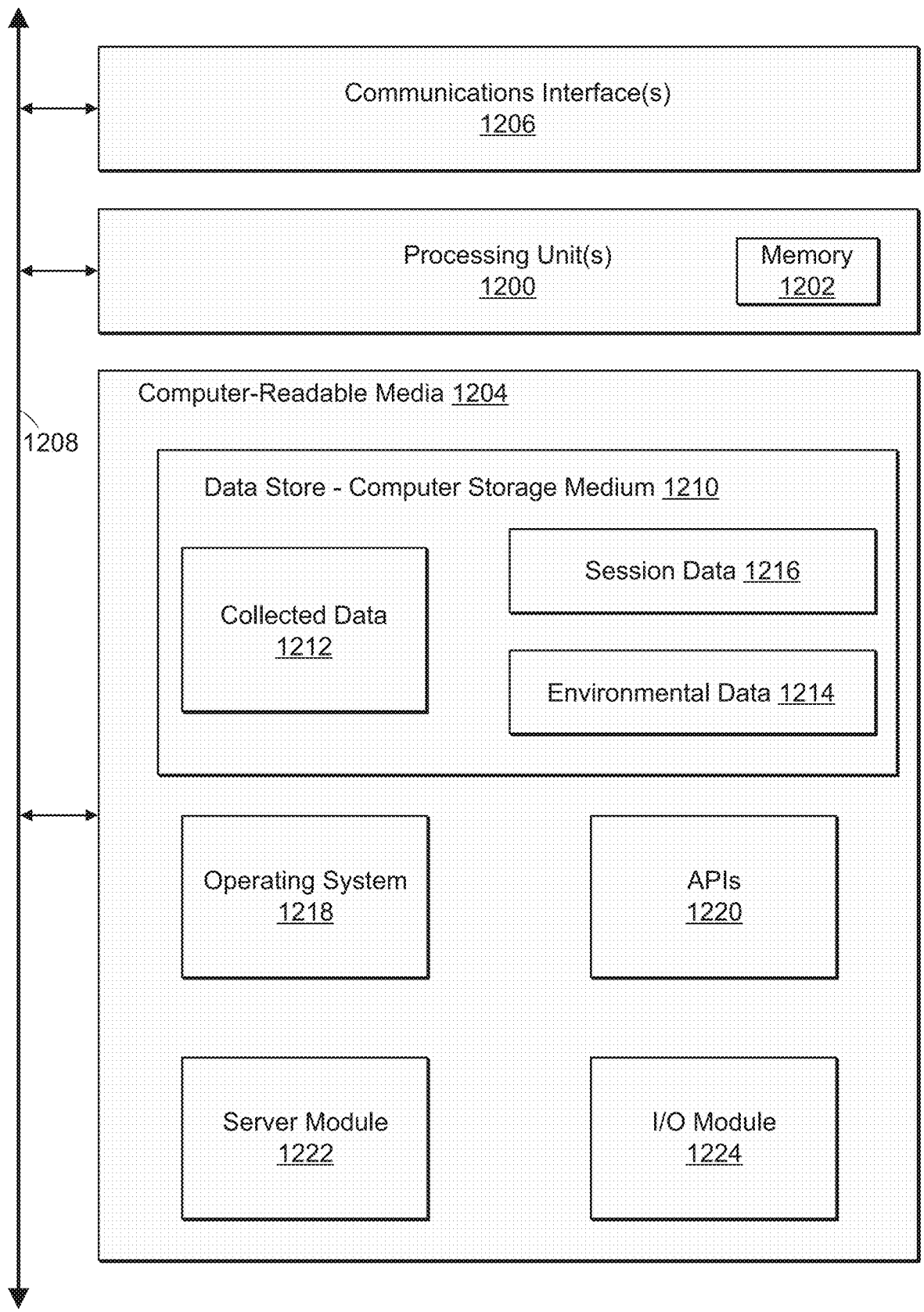
FIG. 12 is a block diagram illustrating an example of an implementation of the hand truck control system within a computing device.

FIG. 12 is a block diagram of an example implementation of the hand truck control system with a computing device. In this example, the computing device includes one or more processors or processing units 1200, one or more memories 1202, a computer-readable medium 1204, and one or more communications interfaces 1206. In this example, the one or more processing units 1200, one or more memory units 1202, computer-readable medium 1204, and one or more communication interfaces 1206 are in signal communication and operatively connected with each other via a bus signal path 1208 that may include one or more system buses such as a data bus, an address bus, a PCI bus, a Mini-PCI bus, and any variety of local, peripheral, and/or independent buses.

The computer-readable medium 1204 includes encoded computer-executable instructions that cause the one or more processors 1200 to generate a data store 1210 from the collected data 1212 from the sensors and user input thus generating control output signals based on the collected data 1212 and optional environmental data.

As utilized, the one or more processing units 1200 may be, for example, a CPU-type processing unit, a GPU-type processing unit, a field-programmable gate array (FPGA), digital signal processor(s) (DSP), or other hardware logic components that may, in some instances, be driven by a central processing unit (CPU). For example, and without limitation, illustrative types of hardware logic components that may be utilized include Application-Specific Integrated Circuits (ASICs), Application-Specific Standard Products (ASSPs), System-on-a-Chip Systems (SOCs), Complex Programmable Logic Devices (CPLDs), etc.

The computer-readable medium 1204 may store instructions executable by the one or more processing units 1200. The computer-readable medium 1204 may also store instructions executable by external processing units (not shown) such as by an external CPU, an external GPU, and/or executable by an external accelerator, such as an FPGA type accelerator, a DSP type accelerator, or any other internal or external accelerator. In various embodiments, at least one CPU, GPU, and/or accelerator is incorporated in the computing device, while in other embodiments, one or more of a CPU, GPU, and/or accelerator may be external to the computing device.

The computer-readable medium 1204 may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media may include tangible and/or physical forms of media included in a device and/or hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to the computer storage medium 1210, communication media may embody computer-readable instructions, data structures, program modules, or other data in a modulated data signal, such as a carrier wave, or other transmission mechanism.

The one or more communication interfaces 1206 may represent, for example, network interface controllers (NICs) or other types of transceiver devices to send and receive communications over a network. In this example, the computer-readable medium 1204 includes a data store 1210. In some examples, the data store 1210 may include data storage such as a database, data warehouse, or other type of structured or unstructured data storage for operation of computing device and the hand truck control system. In some embodiments, the data store 1210 may include a corpus and/or a relational database with one or more tables, indices, stored procedures, and so forth to enable data access of the hand truck control system by a user including, for example, one or more of hypertext markup language (HTML) tables, resource description framework (RDF) tables, web ontology language (OWL) tables, and/or extensible markup language (XML) tables or other means for storing data.

The data store 1210 may store data for the operation of processes, applications, components, and/or modules stored in computer-readable medium 1204, such as the hand truck control system and/or executed by the one or more processing units 1200 and/or accelerator(s). As an example, the data store 1210 may store environmental data 1214, session data 1216 and/or other collected data 1212. The session data 1216 may include data relating to the training sessions performed by the hand truck control system. Other examples of session data 1216 include, but are not limited to, operational characteristics of the hand truck for the previous pre-determined amount of time, e.g., hours of operation or days of operation, etc.

Alternately, some or all of the above-referenced data may be stored on the separate one or more memory units 1202 on board the one or more processing units 1200 such as, for example, a memory on board a CPU-type processor, a GPU-type processor, an FPGA-type accelerator, a DSP-type accelerator, and/or another accelerator. In this example, the computer-readable medium 1204 also includes an operating system 1218 and application programming interfaces (APIs) 1220 configured to expose the functionality and the data generated by the operation of the hand truck control system to external devices associated with the computing device via the one or more communication interfaces 1208.

Additionally, the computer-readable medium 1204 may include one or more modules such as a server module 1222 an input/output (I/O) module 1224, although the number and function of illustrated modules is just an example, and the number may vary higher or lower. The server module 1222 can act as a longer term storage medium for data collected by the hand truck. A wireless interface can connect the hand truck to a cloud based server system where operational, session and environmental data is stored. In another embodiment, a wired interface can connect with the hand truck during battery recharging such that the data stored in memory on the hand truck is periodically uploaded to a cloud based server system.

That is, the functionality described in this disclosure in association with the illustrated modules in the computing device may be performed by a fewer number of modules or a larger number of modules on one device or spread across multiple devices. In this example, the output module 1224 may be in signal communication with one or more output devices such as, for example, one or more displays, sound generating loud speakers or a mobile device that allow the hand truck user to see and hear data related to the operation of the hand truck. Similarly, the input module may be in signal communication with one or more input devices such as, for example, a virtual or actual keyboard, mouse or joy stick controller, general pointing device, or a touch screen that accepts input commands from the hand truck user to respond to and input commands to the computing device.

Figure 28A:
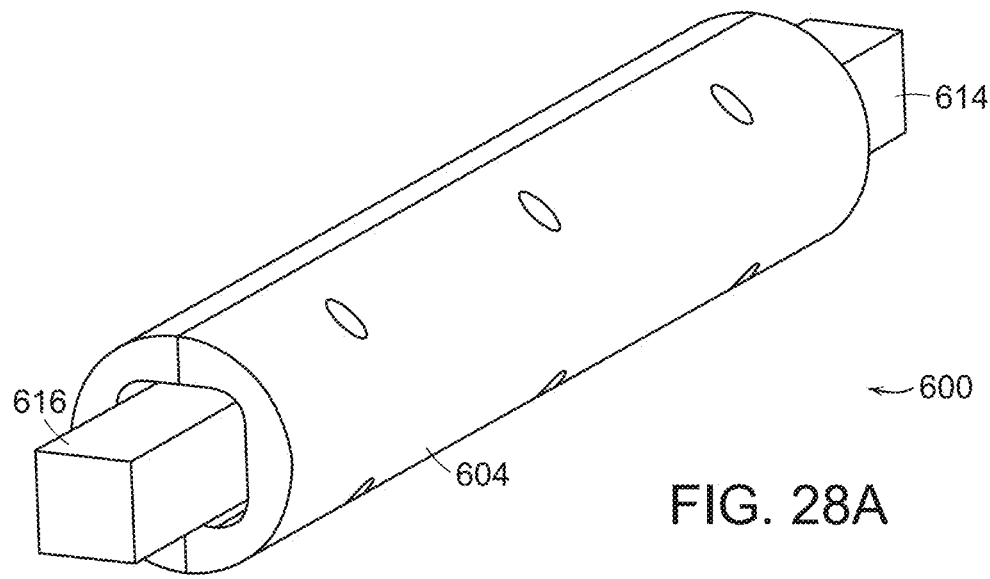
FIGS. 28A-28C are perspective views of a force sensing assembly in accordance with an aspect of the present disclosure.
Figure 28B:
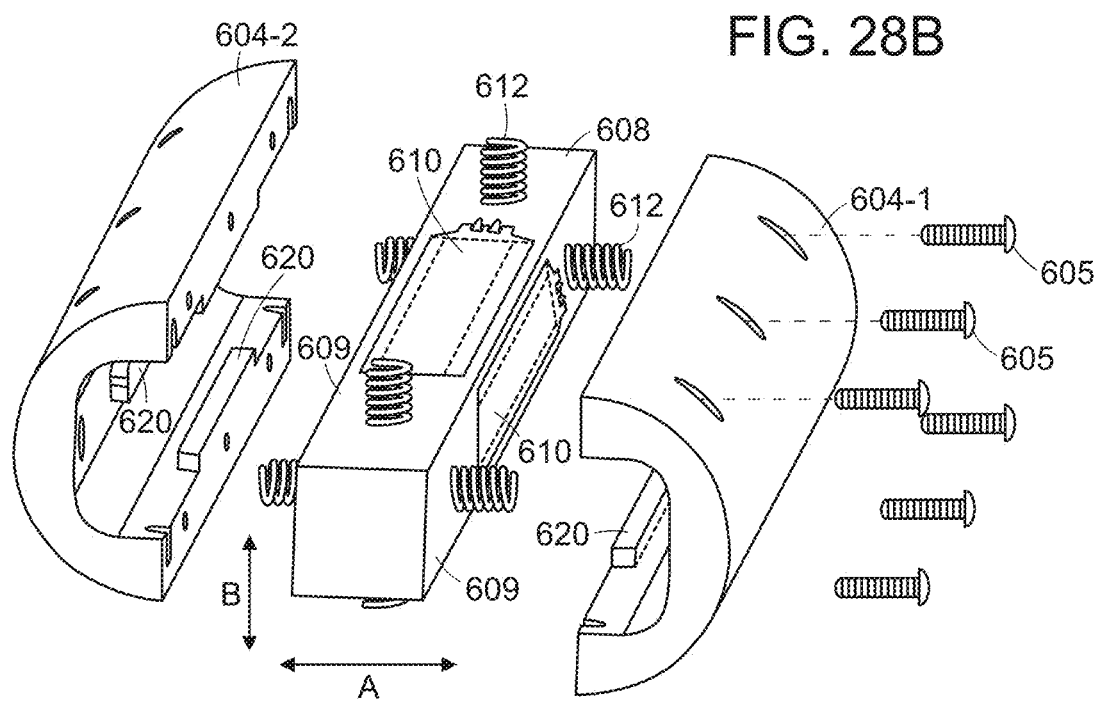
Figure 28C:
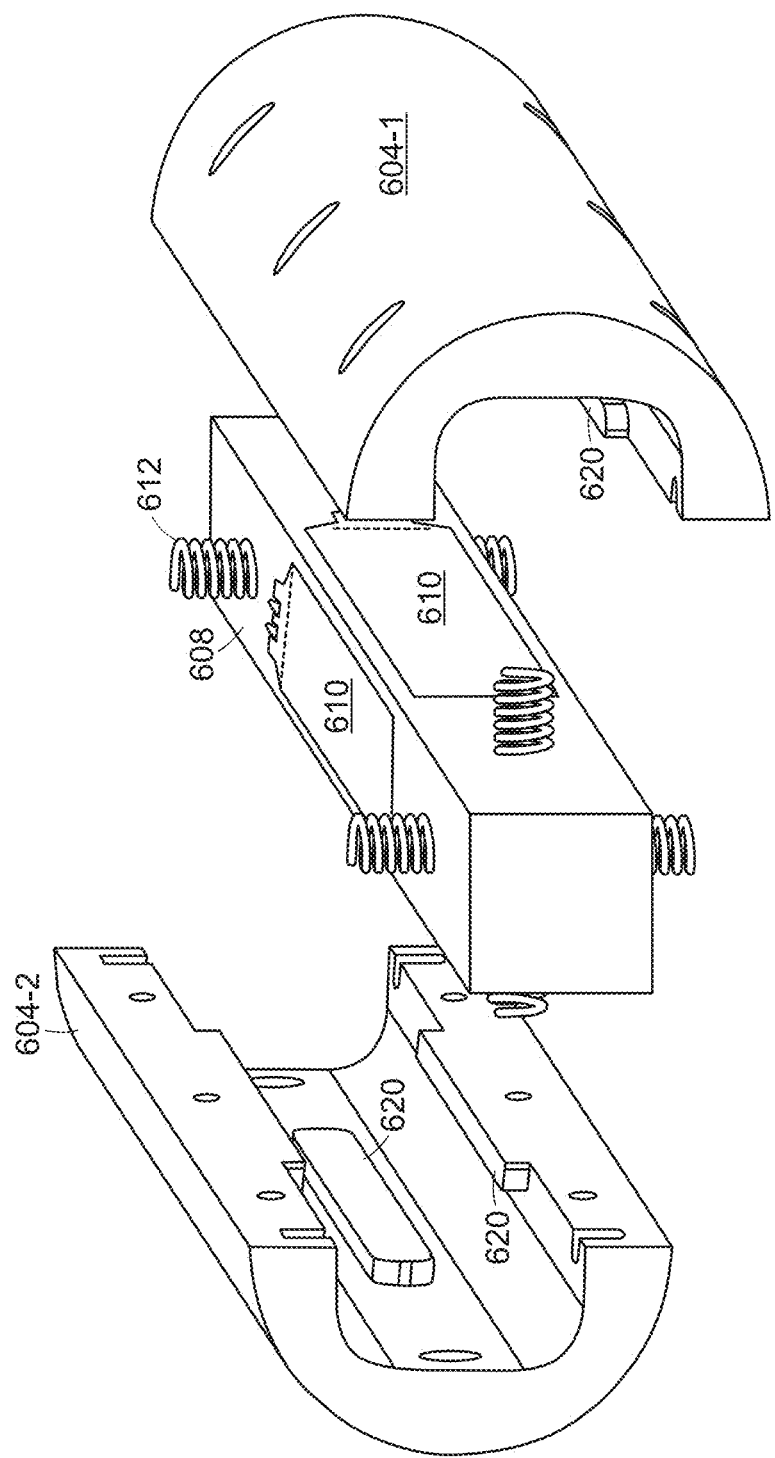

Referring now to FIGS. 28A-28C, in one implementation in accordance with the present disclosure, a force sensing assembly 600 uses flexible circuit sensors to measure force in two directions, i.e., along two axes that are orthogonal to one another. The sensing assembly 600 includes a housing 604 made from two pieces 604-1 and 604-2 and held together by a plurality of screws 605. A structural bar 608 with four (4) faces 609 defined along a longitudinal length of the bar 608 is provided within the housing 604. Generally, the bar 608 is made of a material of sufficient strength to withstand the expected forces that it may experience. The bar 608 may be made from steel, aluminum, etc., and while an exemplary bar 608 is shown with a square cross-section, the bar may be, for example, round, hexagonal, etc. Each face 609 is provided with a respective flexible circuit sensor 610 disposed thereon by, for example, adhesive or other known attachment mechanism. The sensor 610 may be, for example, an FSR® 400 Series Force Sensing Resistor from Interlink Electronics of Westlake Village, Calif. Each sensor 610 includes the necessary connections (not shown) to communicate with the controller 402 as would be understand by one of ordinary skill in the art.

The bar 608 is maintained in a "neutral" position, i.e., where no force is being applied to the assembly 600, by a plurality of springs 612 disposed between the faces 609 and an inner surface of the housing 604. The springs 612 restrain the bar 608 to move along either an "A" axis or a "B" axis where the two axes are orthogonal to one another. While springs 612 are shown in the present disclosure to maintain the relationship between the bar 608 and the housing 604, other mechanisms that provide such flexibility, for example, foam, rubber, plastics, etc., can be implemented.

Figure 29A:
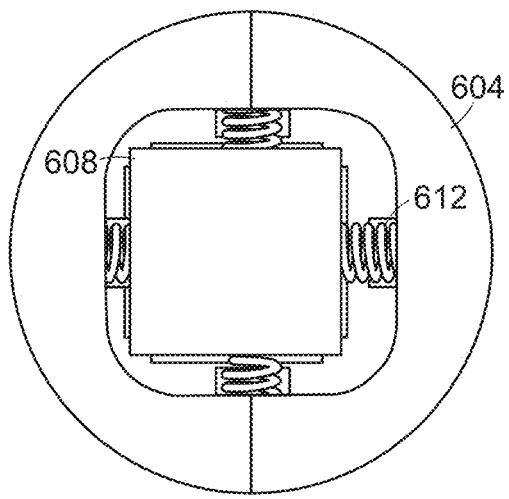
FIGS. 29A-29C are side views of the force sensing assembly of FIGS. 28A-28C in operation.
Figure 29B:
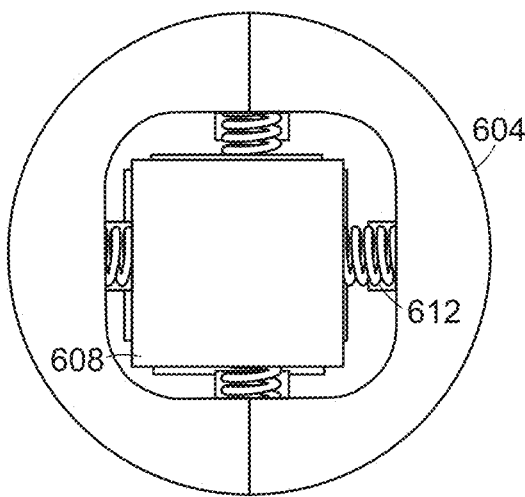
Figure 29C:
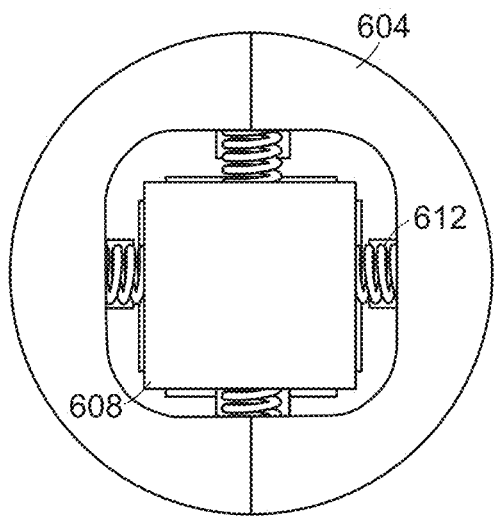
Figure 30A:
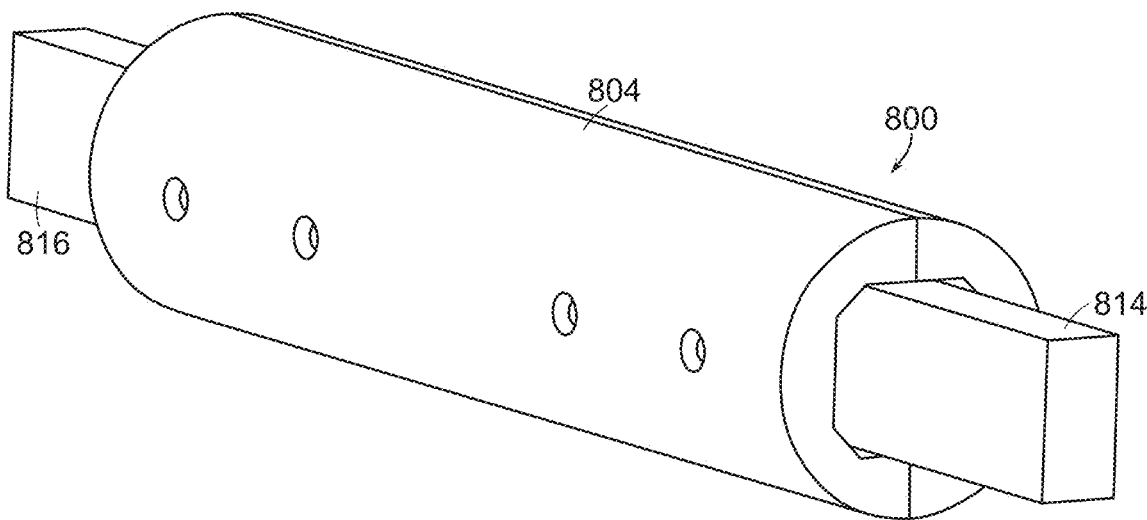
FIGS. 30A-30D are perspective views of a force sensing assembly in accordance with an aspect of the present disclosure.
Figure 30B:
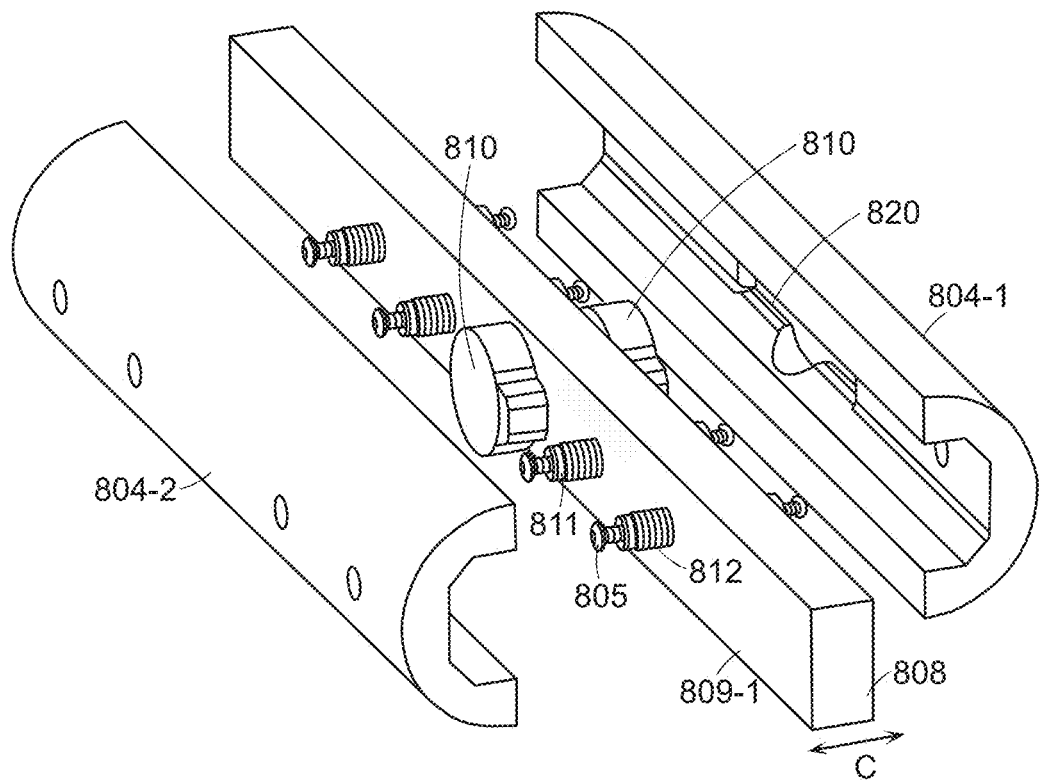
Figure 30C:
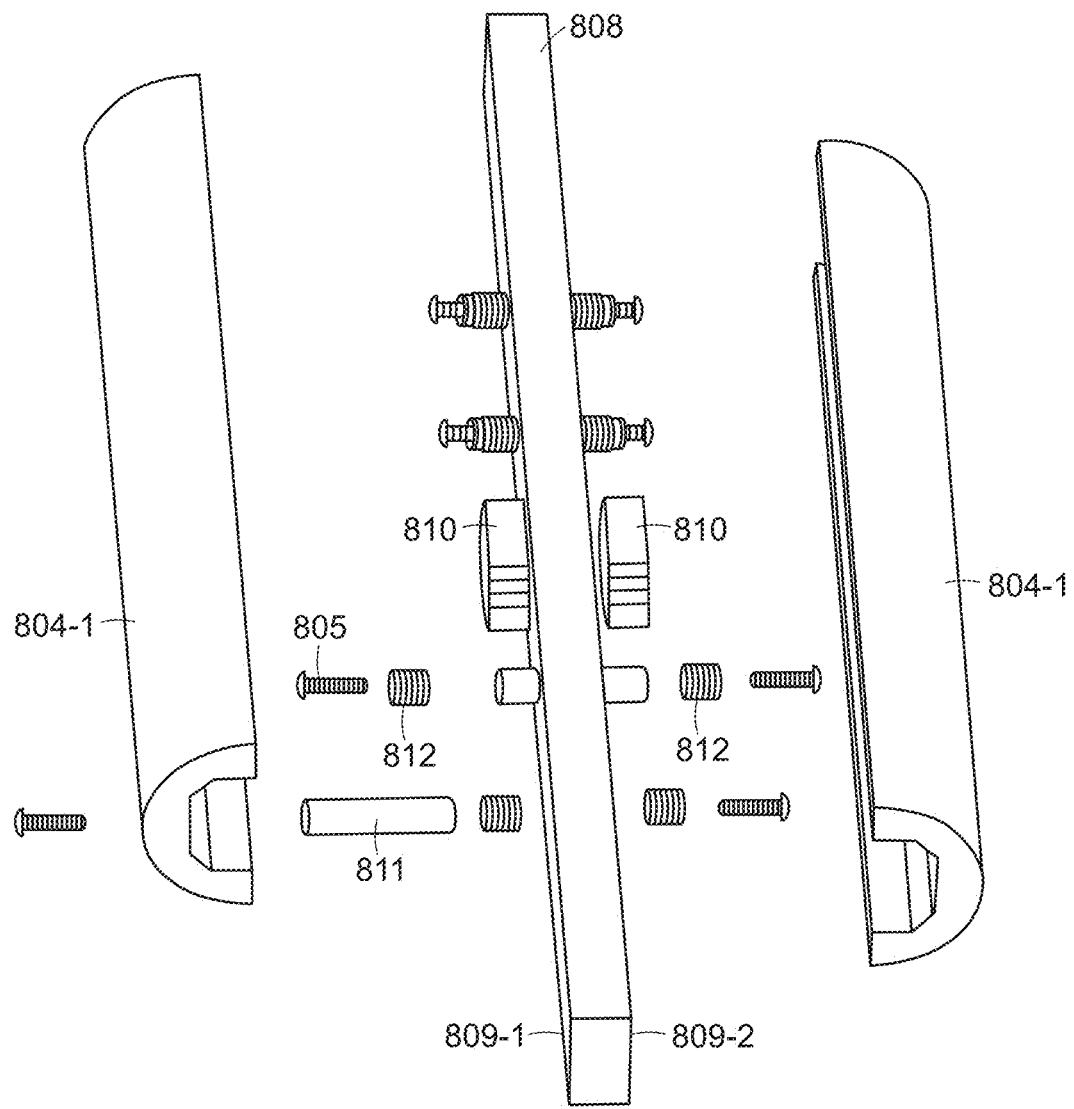
Figure 30D:
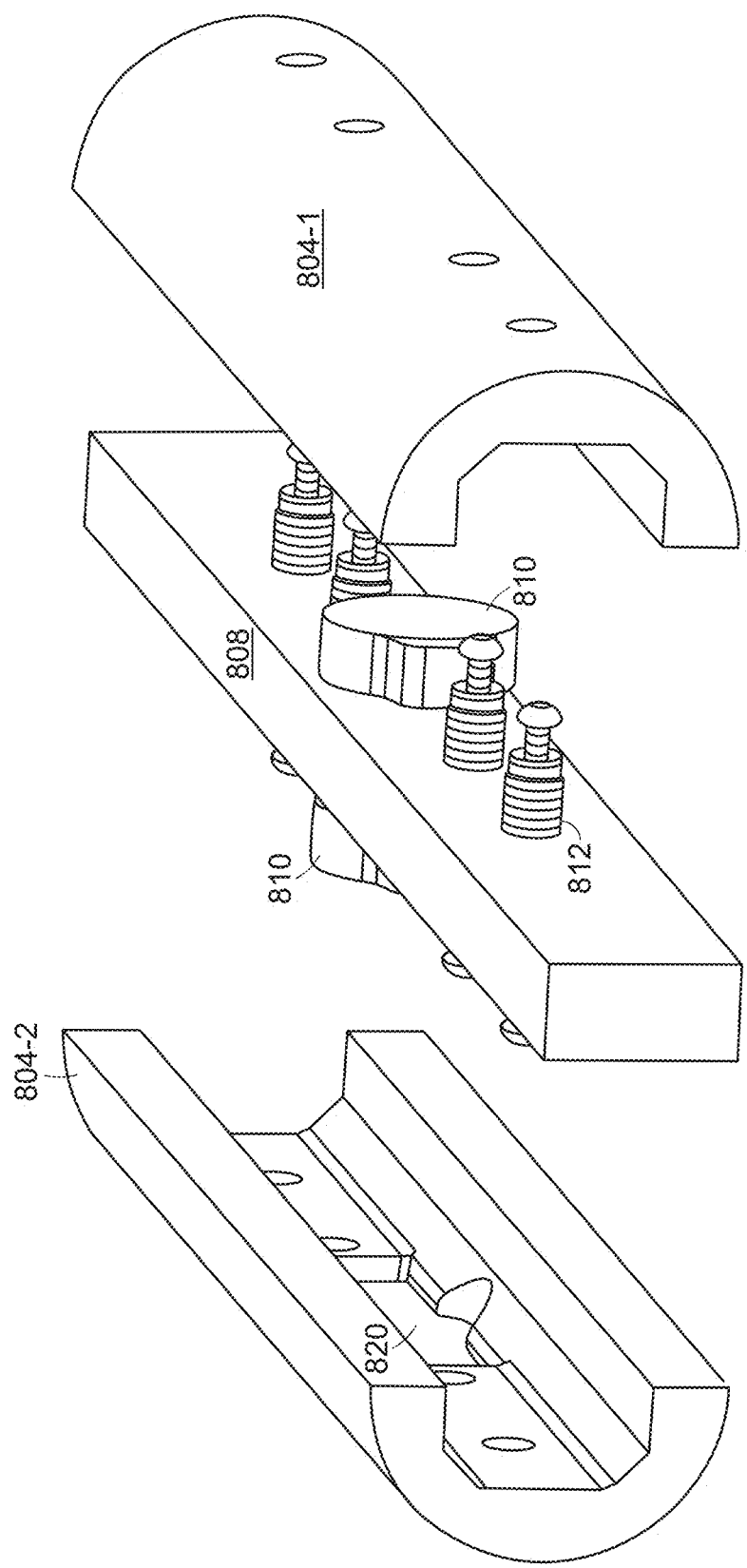

First and second ends 614, 616 of the bar 608 extend from the housing 604. The two ends 614, 616 are each affixed to the vehicle 200, for example, attached to, or incorporated into, the handle 208. As a result, the bar 608 does not move with respect to the vehicle 200. When a force is applied to the housing 604, for example, by the operator, referring now to FIGS. 29A-29C, the springs 612 will compress or expand accordingly. A respective contact feature 620 is provided within the housing 604 in opposition to each sensor 610. When the housing 604 moves, the contact feature 620 contacts the sensor 610. The amount of force in each axis is then measured by the controller 402 and is used to determine the amount of torque to be applied to the wheels in response thereto.

Referring now to FIGS. 30A-30D, in another implementation in accordance with the present disclosure, a force sensing assembly 800 uses single axis load cells to measure force along an axis. The sensing assembly 800 includes a housing 804 made from two pieces 804-1 and 804-2 and held together by a plurality of screws 805, as will be described below. A structural bar 808 with two (2) opposing faces 811-1, 811-2 defined along a longitudinal length of the bar 808 is provided within the housing 804. Generally, the bar 808 is made of a material of sufficient strength to withstand the expected forces that it may experience. The bar 808 may be made from steel, aluminum, etc., and while an exemplary bar 808 is shown with a square cross-section, the bar may be, for example, round, hexagonal, etc. Each face 809-1, 809-2 is provided with a respective single-axis load cell sensor 810 disposed thereon by, for example, adhesive or any other known attachment mechanism. The sensor 810 may be, for example, an FX1901 Compression Load Cell from TE Connectivity company of Fremont, Calif. Each sensor 810 includes the necessary connections (not shown) to communicate with the controller 402 as would be understand by one of ordinary skill in the art.

The bar 808 is maintained in a "neutral" position, i.e., where no force is being applied to the assembly 800, by a plurality of standoffs 811 and corresponding springs 812 disposed between the faces 809-1, 809-2 and an inner surface of the housing 804. The standoffs 811 and the springs 812 restrain the bar 808 to move along a "C" axis. While springs 812 are shown in the present disclosure to maintain the relationship between the bar 808 and the housing 804, other mechanisms that provide such flexibility, for example, foam, rubber, plastics, etc., can be implemented.

Figure 31A:
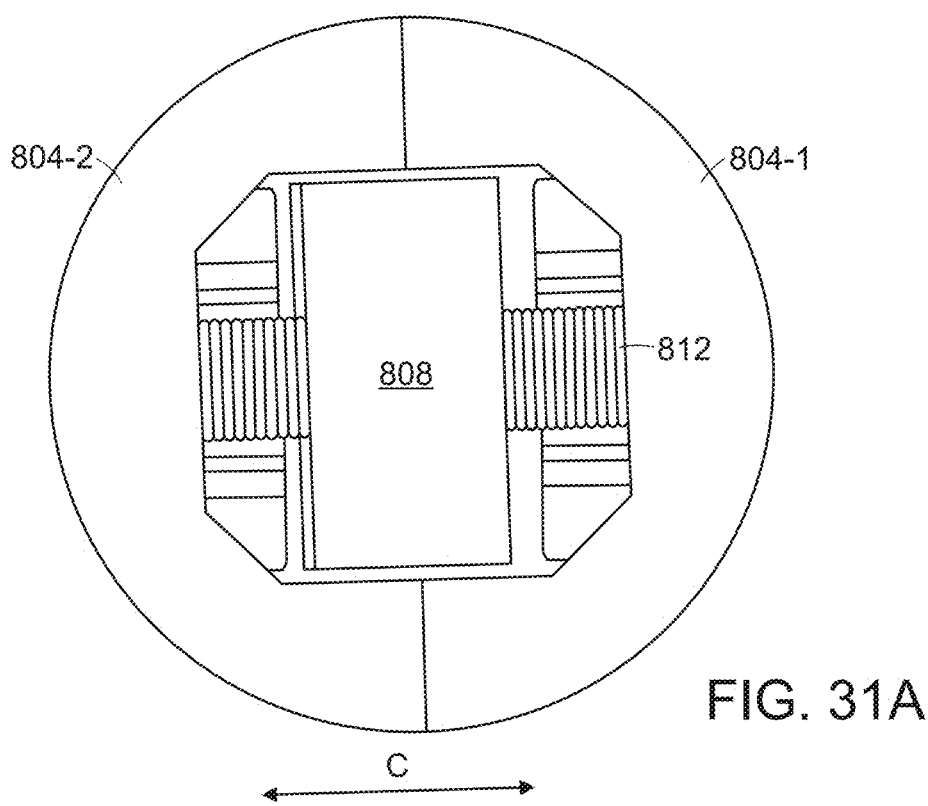
FIGS. 31A-31C are side views of the force sensing assembly of FIGS. 30A-30D in operation.
Figure 31B:
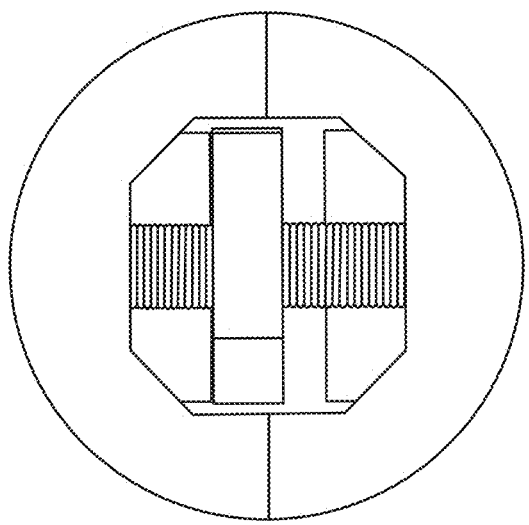
Figure 31C:
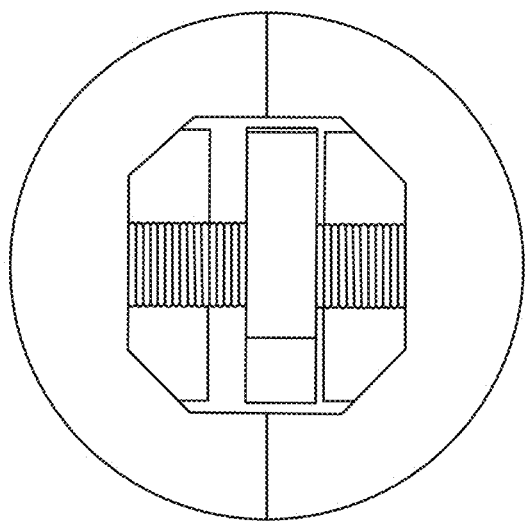

First and second ends 814, 816 of the bar 808 extend from the housing 804. The two ends are each affixed to the vehicle 200, for example, attached to, or incorporated into, the handle 208. As a result, the bar 808 does not move with respect to the vehicle 200. When a force is applied to the assembly 800, for example, by the operator, referring now to FIGS. 31A-31C, the springs 812 will compress or expand accordingly. A respective contact feature 820 is provided within the housing 804 in opposition to each sensor 810. When the housing 804 moves, the contact feature 820 contacts the sensor 810. The amount of force is then measured by the controller 402 and is used to determine the amount of torque to be applied to the wheels in response thereto.

As the amount of force measured by the assembly 800 is only in one axis, an angle at which the vehicle 200 is being operated, with respect to the direction of gravity g, can be determined from, for example, a tilt sensor or the IMU 416. The amount of "push" force and "lift" force being exerted by the operator can then be calculated from that angle and the corresponding amount of torque to apply determined therefrom.

Of course, one of ordinary skill in the art would understand that two sensor assemblies 800 could be implemented with the respective sensing axis positioned orthogonally with respect to the other. Such an arrangement may not then need to determine an angle at which the vehicle is operating in order to determine the amount of additional torque to provide.

Figure 32A:
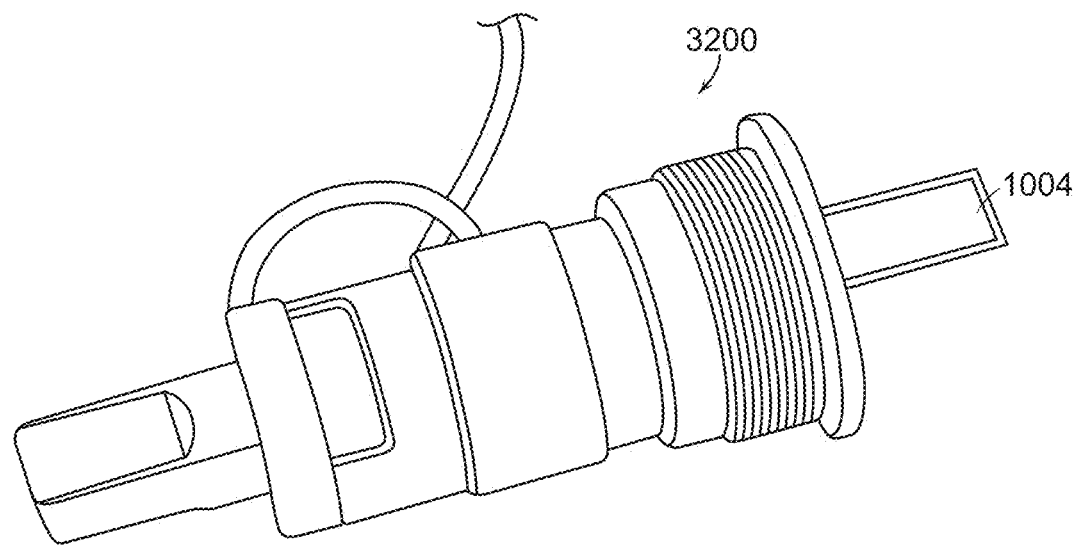
FIGS. 32A and 32B are perspective views of a torque sensing assembly in accordance with an aspect of the present disclosure.
Figure 32B:
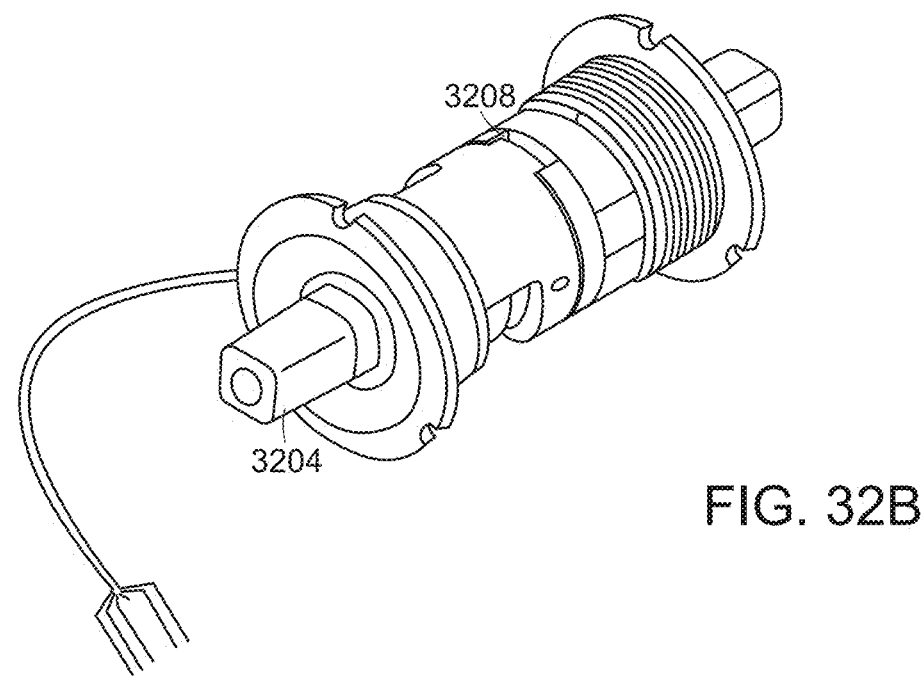

In another aspect of the present disclosure, referring now to FIGS. 32A and 32B, a torque sensing assembly 3200 is used to measure force applied by the operator. The torque sensing assembly 3200 could be a Thun X-Cell Sensory Bottom Bracket from Alfred Thun GmbH & Co. KG, Ennepetal, Germany. The sensing assembly 3200 includes a spindle 3204 disposed within a housing 3208 that includes a sensor plate (not shown). Each sensor 3200 includes the necessary connections to communicate with the controller 402 as would be understood by one of ordinary skill in the art.

The housing 3208 is affixed to the vehicle 200, for example, attached to, or incorporated into, the handle 208. As a result, the housing 3208 does not move with respect to the vehicle 200 and the axis of torque is predetermined with respect to an orientation of the vehicle 200. The spindle 3204 is attached to the handle 208 in such a position that when a force is applied by the operator, the amount of force will be measured as a torque force by the sensing assembly 3200. The amount of operator-applied torque is then measured by the controller 402 and is used to determine the amount of torque to be applied to the wheels in response thereto.

As the assembly 3200 is measuring torque, an angle at which the vehicle 200 is being operated, with respect to the direction of gravity g, is determined from, for example, a tilt sensor or the IMU 416. The amount of "push" force and "lift" force being exerted by the operator can then be calculated from that angle and the corresponding amount of torque to apply to the wheels determined therefrom.

Advantageously, aspects of the present disclosure provide more intuitive controls for power assisted devices whose unassisted counterparts are controlled by pushing or pulling the device itself. That is, aspects of this disclosure allow the operator to use identical inputs, i.e., pushing and pulling on a handle, to control power-assisted versions of existing products. The effort of the operator is measured and the amount of provided assist is proportional to the effort.

With the more intuitive, i.e., more familiar, controls of the present disclosure, necessary training for the power-assisted version is reduced because of the similarity to operation of the non-powered counterpart. Further, design changes to existing products are minimized allowing for easier retrofitting or manufacturing. An "electronic throttle" control of the powered device can be implemented without changing the motion or adding a new motion as compared to the operation of the non-powered device. Thus, those throttle controls such as thumbwheels, joysticks, and grip throttles, can be avoided.

It is to be understood that various aspects of the present disclosure have been described using non-limiting detailed descriptions of implementations thereof that are provided by way of example only and are not intended to be limiting. Features and/or steps described with respect to one implementations may be used with others and not all have all of the features and/or steps shown in a particular figure or described with respect to one of the implementations. Variations will occur to persons of skill in the art.

It should be noted that some of the above described implementations include structure, acts or details of structures and acts that may not be essential and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor.

What is claimed is:

1. A method of operating a hand truck carrying a payload over a surface, the hand truck having first and second laterally disposed wheels positioned along a central axis, wherein each of the first and second laterally disposed wheels is powered by, respectively, a first and a second motor, the method comprising:
   a user setting the hand truck in an orientation at a static balance point by applying a force to the hand truck and positioning the hand truck to place a center of mass of the hand truck and the payload directly above the central axis such that only the first and second laterally disposed wheels are contacting the surface; and
   subsequent to the user setting the hand truck in the static balance point orientation and no longer applying force to the hand truck:
      controlling at least one of the first and second motors to provide torque to at least one of the first and second laterally disposed wheels to maintain the hand truck balanced in place at the static balance point orientation.

2. The method of claim 1, further comprising:
the user tilting the hand truck in a fore or aft direction to place the hand truck in another orientation away from the static balance point orientation; and
controlling each of the first and second motors to provide torque to the respective first or second laterally disposed wheels to move the hand truck fore or aft in order to place the hand truck back at the static balance point orientation.

3. The method of claim 1, further comprising:
the user providing a yaw motion to the hand truck; and
maintaining the hand truck at the static balance point orientation by:
   providing, by the first motor, a first torque value to the first wheel of the two laterally disposed wheels; and
   providing, by the second motor, a second torque value to the second wheel of the two laterally disposed wheels.

4. The method of claim 3, wherein the first and second torque values are not equal to one another.

5. The method of claim 1, wherein the center of mass is a function of an arrangement of the payload on the hand truck.

6. The method of claim 1, wherein controlling each of the first and second motors comprises:
sensing a signal indicative of an orientation and a rate of change of orientation of the hand truck; and
setting the amount of torque as a function of the sensed orientation and rate of change of orientation.

7. The method of claim 1, further comprising:
controlling each of the first and second motors to provide torque to the respective first and second wheel.

8. A method of operating a hand truck carrying a payload over a surface, the hand truck having first and second laterally disposed wheels positioned along a central axis, the method comprising:
   a user setting the hand truck in an orientation at a static balance point by positioning the hand truck to place a center of mass of the hand truck and the payload directly above the central axis such that only the first and second laterally disposed wheels are contacting the surface; and
   subsequent to the user setting the hand truck in the static balance point orientation:
      measuring a force, applied by the user to the hand truck, that moves the hand truck to another orientation away from the static balance point orientation, the measured force comprising a direction and a magnitude; and
      providing torque via one or more motors to each of the first and second laterally disposed wheels to cause each of the first and second laterally disposed wheels to rotate in a respective direction as a function of the measured force direction in order to place the hand truck back at the static balance point orientation and such that the magnitude of the measured force applied by the user is reduced to at or below a predetermined threshold value.

9. The method of claim 8, wherein the center of mass is a function of an arrangement of the payload on the hand truck.

10. The method of claim 8, wherein the user setting the static balance point comprises:
   repeatedly tilting the hand truck fore and aft until observing that an indication of the static balance point being reached has occurred.

11. The method of claim 10, wherein the static balance point indication is at least one of a visual indicator or a sound.

\* \* \* \* \*